(12) United States Patent
Spuller

(10) Patent No.: US 9,408,256 B2
(45) Date of Patent: Aug. 2, 2016

(54) REMOVEABLE HEATING DEVICE FOR A HEATING CHANNEL NOZZLE

(71) Applicant: OTTO MÄNNER INNOVATION GMBH, Bahlingen (DE)

(72) Inventor: Swen Spuller, Forchheim (DE)

(73) Assignee: Otto Männer Innovation GmbH, Bahlingen (DE)

( * ) Notice: Subject to any disclaimer, the term of this patent is extended or adjusted under 35 U.S.C. 154(b) by 296 days.

(21) Appl. No.: 13/961,343

(22) Filed: Aug. 7, 2013

(65) Prior Publication Data

US 2014/0042148 A1    Feb. 13, 2014

(30) Foreign Application Priority Data

Aug. 7, 2012   (DE) .......................... 10 2012 015 583

(51) Int. Cl.
| | |
|---|---|
| *H05B 3/58* | (2006.01) |
| *H05B 3/42* | (2006.01) |
| *H05B 3/46* | (2006.01) |

(52) U.S. Cl.
CPC .. *H05B 3/42* (2013.01); *H05B 3/46* (2013.01); *H05B 2203/014* (2013.01)

(58) Field of Classification Search
CPC .............. H05B 3/45; H05B 3/46; H05B 3/48; H05B 2203/014; H05B 2203/02; B29C 45/2737; B29C 2045/2777; B29C 2045/274; B29C 2045/2741; B29C 2045/2743; B29C 2045/2753; B29C 2045/2754
See application file for complete search history.

(56) References Cited

U.S. PATENT DOCUMENTS

| | | | |
|---|---|---|---|
| 5,704,113 A * | 1/1998 | Mak | ..................... B29C 45/2737 219/421 |
| 6,045,742 A | 4/2000 | McGrevy | |
| 6,163,016 A | 12/2000 | Johnson et al. | |
| 6,252,210 B1 | 6/2001 | Schwarzkopf | |
| 7,049,555 B2 | 5/2006 | Sadowski | |
| 2007/0086759 A1* | 4/2007 | Russegger | .......... B29C 45/2737 392/473 |
| 2007/0124907 A1 | 6/2007 | Russegger et al. | |
| 2012/0189288 A1 | 7/2012 | Vogt et al. | |
| 2013/0034621 A1 | 2/2013 | Spuller | |

FOREIGN PATENT DOCUMENTS

| | | |
|---|---|---|
| DE | 10247509 A1 | 4/2004 |
| DE | 10333206 B4 | 4/2007 |
| DE | 202010010581 U1 | 10/2010 |
| DE | 102009039778 A1 | 3/2011 |

* cited by examiner

*Primary Examiner* — Shawntina Fuqua
(74) *Attorney, Agent, or Firm* — McAndrews, Held & Malloy, Ltd.

(57) ABSTRACT

A removable heating device for a hot runner nozzle contains an elongated heating unit which exhibits at least one longitudinal slot which does not extend as far in the longitudinal direction as the length of a substantially cylindrical heating unit and which enables an enlargement of the inner diameter of the heating unit by its open end. The heating device further has a channel disposed in the outer surface of the heating unit in which an electrical heating element is disposed. Furthermore, a heater/thermocouple assembly contains such a heating device and at least one thermocouple for detecting the temperature in the front end region of the hot runner nozzle.

57 Claims, 16 Drawing Sheets

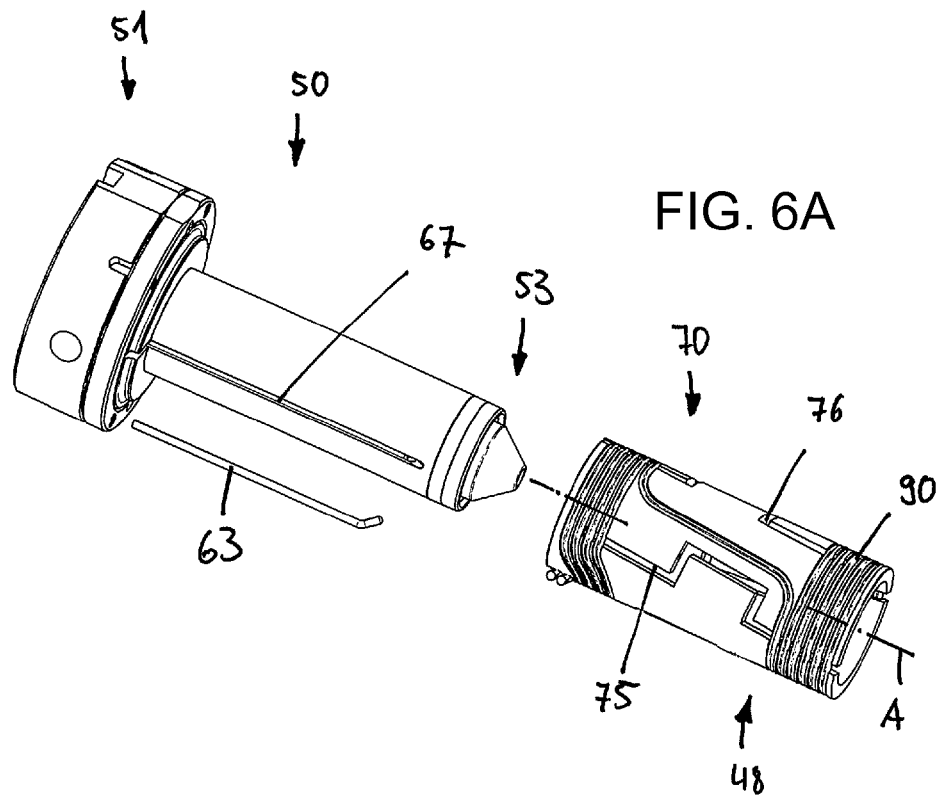
FIG. 6A
FIG. 6B
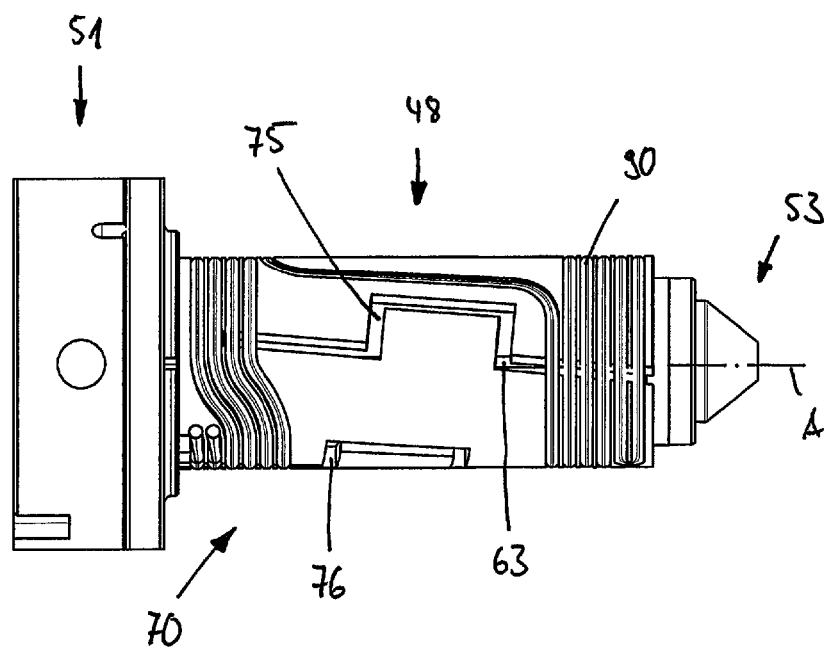

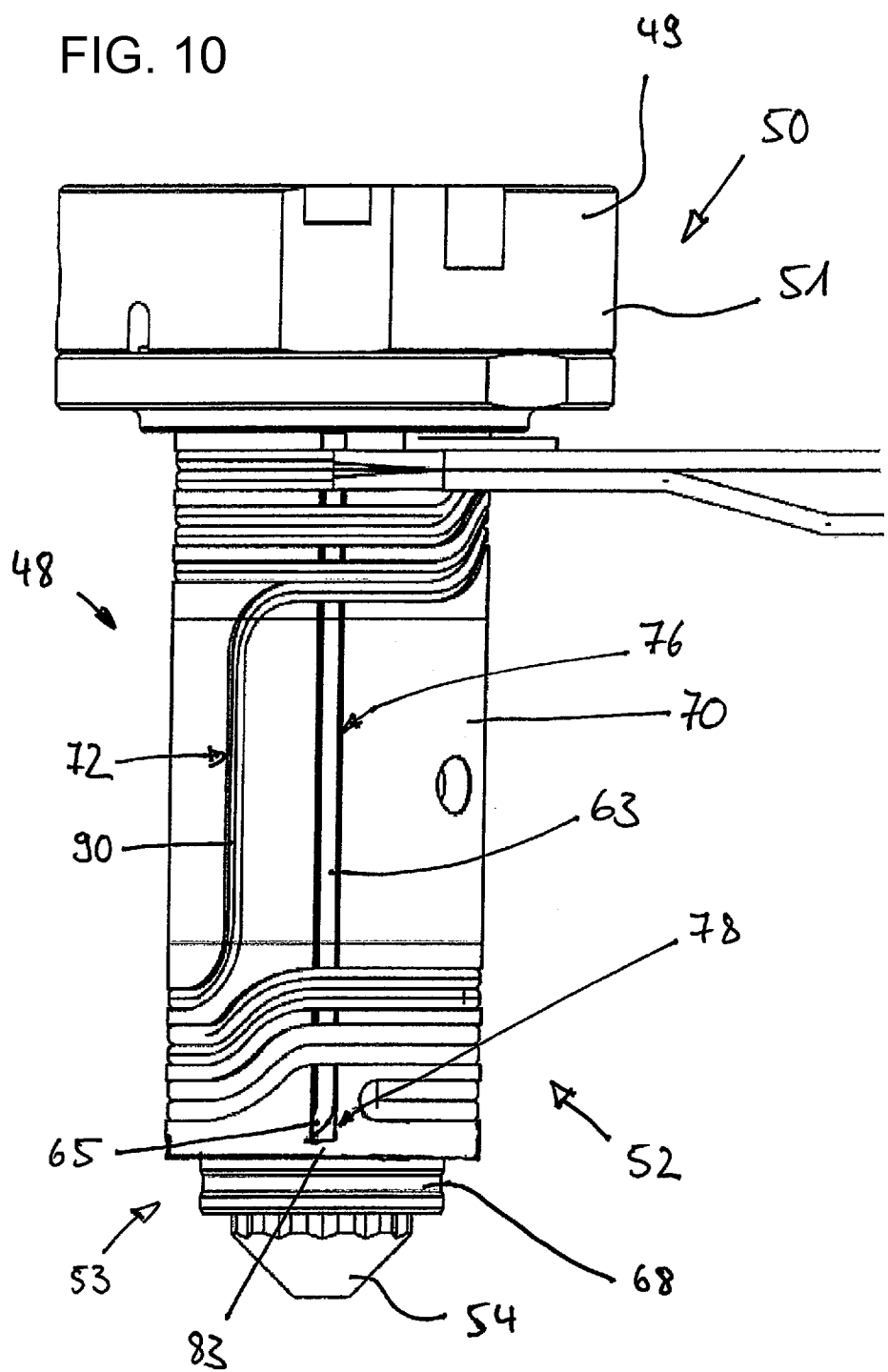

REMOVEABLE HEATING DEVICE FOR A HEATING CHANNEL NOZZLE

CROSS-REFERENCE TO RELATED APPLICATIONS

This application claims benefit of priority from German (DE) Patent Application No. 10 2012 015 583.2, filed Aug. 7, 2012, which is herein incorporated by reference in its entirety.

BACKGROUND

The present invention relates to a removable heating device as well as a heater/thermocouple assembly for a hot runner nozzle.

Heating devices are used to control the temperature of hot runner nozzles on injection molding machines. The objective in doing so is the most uniform thermal profile possible. To achieve a good transfer of heat, such heating devices are mounted on hot runner nozzles with the best possible contact. Often a bond forms between a hot runner nozzle and a heating unit for example due to material penetrating the gap between said components when heated during the operation of an injection molding machine. Such bonds hinder the removal of heating devices from hot runner nozzles, particularly for maintenance purposes. A thermocouple of a heater/thermocouple assembly serves to detect the temperature in the area of the heating unit or on the hot runner nozzle respectively, particularly in order to ascertain the temperature of the melt conducted inside the hot runner nozzle.

SUMMARY

Taking this as a starting point, the invention is based on the object of developing a heating device as well as a heater/thermocouple assembly for a hot runner nozzle which has improved properties with respect to their removal.

This object is accomplished in accordance with the invention by the teachings of the independent claims. Preferential further embodiments of the invention constitute the subject matter of the subclaims.

A removable heating device for a hot runner nozzle according to the invention exhibits a particularly elongated heating unit made from a thermoconductive material. Such a heating unit for a hot runner nozzle exhibits an inner diameter, a length, an axis, an inner surface, an outer surface and a wall thickness. In particular, the heater element exhibits a hollow cylindrical form.

The heating unit of the inventive heating device further exhibits at least one first longitudinal slot which does not extend as far in the longitudinal direction, thus parallel to the axis, as the length of the substantially cylindrical heating unit. The longitudinal slot thus does not extend from one end to the other. The longitudinal slot exhibits a width and has an open end on a first face side of the heating unit and a closed end on a second face side of the heating unit so as to form a first bridge. The bridge limits an enlargement of the inner diameter of the heating unit on one end of the heating unit, wherein the open end of the longitudinal slot enables the inner diameter to enlarge.

The heating unit of the inventive heating device further comprises a channel disposed in the outer surface of the heating unit which winds around the heating unit. The channel exhibits a bottom surface and two side walls, wherein the channel runs completely around the heating unit and crosses the longitudinal slot at least once.

An inventive removable heating device for a hot runner nozzle further comprises an electrical heating element having a heater wire, wherein the heater wire is disposed in a heater housing. The heater housing is at least partially arranged in the channel and is in direct contact with the bottom surface and with at least one of the two side walls of the channel so as to transfer the heat generated by the heating element via the contact between the inner surface of the heating unit and the outer surface of the hot runner nozzle to same. The heating element thereby limits the heating unit from radially expanding in the area of the longitudinal slot due to warming or due to mechanical force.

The heating unit of the inventive removable heating device is preferentially mounted with its inner diameter around the outer diameter of a normally elongated substantially cylindrical hot runner nozzle. Preferably, a removable heating device controls the temperature of a hot runner nozzle substantially along its entire length or a part of its longitudinal extension, in particular to keep the melt conducted in the hot runner nozzle flowable. Particularly adequate temperature control of the front end region of the hot runner nozzle is thereby of importance. On the one hand, the temperature of the melt injected into the cavity directly affects the quality of the manufactured workpiece. On the other hand, the front end of the hot runner nozzle, in particular the nozzle tip, is disposed in the direct vicinity of the mold, whereby thermal energy flows from the hot runner nozzle particularly to the mold. To provide good heat distribution, the elongated heating unit is made from a material which is a good conductor of heat. Suitable materials are thereby copper or aluminum as well as alloys having at least a percentage of said metals.

The heating unit of the heating device comprises at least one first longitudinal slot which extends less in the longitudinal direction than the length of the substantially cylindrical heating unit. The axial extension of the longitudinal slot is thereby shorter than the length of the substantially cylindrical heating unit. The longitudinal slot divides the wall of the heating unit and thereby exhibits a width which enables a tool to engage in the longitudinal slot in order to effect a certain opening of the heating unit wall. The width of the longitudinal slot can thereby be constant at least in sections or can vary continuously or even erratically along the heating unit or portions thereof. The longitudinal slot thereby does not extend as far in the longitudinal direction of the heating unit as the length of the heating unit and exhibits one open end and one closed end on the face sides of the heating unit so that the heating unit is not completely partitioned in the longitudinal direction. The extension of the longitudinal slot relative to the axial length of the heating unit amounts to at least 60% of the heating unit length, in particular at least 80%, preferentially at least 85%, particularly preferentially approximately 90% and in particular exactly 90% of the heating unit length.

By the longitudinal slot not extending over the entire length of the heating unit, an oversized opening of the heating unit at the longitudinal slot is prevented, which could arise in particular as a result of an action by a tool or as a result of a thermally induced radial expansion of a hot runner nozzle arranged within the heating unit. By this limiting of the heating unit opening at the longitudinal slot, in particular better heat transfer is also achieved by a larger contact area between the heating unit and the hot runner nozzle in the area adjacent the longitudinal slot and thus also a uniform thermal profile at the hot runner nozzle.

A reduction in the contact area between the heating unit and the hot runner nozzle arises at a longitudinal slot configured in a heating unit not only due to the lack of contact area within the geometrical delimitation of the longitudinal slot but in particular also due to areas of the heating unit wall adjacent the longitudinal slot raising from the hot runner nozzle. This raising results particularly from the lack of a connection between the two opposite sides of the longitudinal slot. Such an absent connection leads to the wall in the area of the edges of such a longitudinal slot assuming a smaller curvature and thus in particular a larger inner diameter, in particular as a result of a thermal load. A continuous slot thus favors a raising of the inner surface of a heating unit from the outer surface of a hot runner nozzle in the area of a longitudinal slot.

In the case of a non-continuous slot, the inclination to the edges is continuously reduced to assume a smaller curvature toward the closed end of a longitudinal slot. Using longitudinal slots closed at one end thus leads to a larger contact area between the heating unit and the hot runner nozzle and, in consequence thereof, to the formation of a more uniform thermal profile than when using continuous longitudinal slots.

The longitudinal slot according to the invention can be of different forms. In a first preferred embodiment, the longitudinal slot exhibits the form of a straight line which runs parallel to the axis of the heating unit from one end to the other end. The axial extension of the longitudinal slot thereby corresponds to the length of the longitudinal slot.

In a further preferred embodiment, although the longitudinal slot likewise exhibits the form of a straight line, same runs at an angle relative to the axis of the heating unit from one end to the other end. The longitudinal slot thereby runs at an inclination to the longitudinal axis. The axial extension of the longitudinal slot is thus less than the length of the longitudinal slot. Advantageous with such a configuration of the longitudinal slot is that an element arranged within the diameter of the heating device possibly parallel to the longitudinal axis, such as for example a thermocouple, cannot enter into the longitudinal slot upon the heating device being rotated since it is inclined relative to longitudinal axis. Damage to an element axially arranged within the heating device can thus be prevented. Preferably the longitudinal slot is inclined at an angle in the approximate range of 0.5° to 30° relative to the longitudinal axis, particularly in a range of from 1° to 15°, preferentially in a range of from 1.5° to 10° and particularly preferentially in a range of from 3° to 5° relative to the longitudinal axis of the heating unit. The angle of the longitudinal slot inclination relative to the longitudinal axis of the heating unit is thereby preferentially defined in a lateral view of the heating unit, thus a projection of the heating unit into the plane of projection.

In a further preferred embodiment, the longitudinal slot likewise exhibits a form which deviates from a straight line. In this embodiment, the longitudinal slot can have a regular or irregular wave or stepped form. It is thereby possible for the waved or stepped form to be of regular or irregular configuration. The stepped form can be further characterized by sections disposed at an angle to one another, said sections arranged at sharp, right or obtuse angles to each other. Combinations of different longitudinal slot configurations are also possible which can respectively be adapted to the intended purpose and in particular the tool intended to be used in the removal process. The direction of the slot's extension can thereby likewise extend toward the longitudinal axis or at an inclination thereto. Following for example a curve is likewise possible. Common to these divergent longitudinal slots compared to a straight longitudinal slot is that they are longer in length than the extension of the longitudinal slot in the direction of the longitudinal axis.

A variation in the design of the geometry of the longitudinal slot is then in particular necessary when elements, such as for example thermocouples, are arranged on a hot runner nozzle which could be damaged if they enter into a longitudinal slot of the heating device disposed around the hot runner nozzle. Such thermocouples or similar devices are often disposed in recesses introduced into the circumferential surface of the hot runner nozzle. When such devices arranged on the hot runner nozzle are used, the heating device also serves to hold said devices in position in order to ensure their function. A heating device arranged around the hot runner nozzle can realize a rotational movement around the hot runner nozzle during the operation of an injection molding machine, in the course of which for example the thermocouple can enter into a longitudinal slot of the heating device. It is likewise possible for the thermocouple to enter into a longitudinal slot of the heating device during the mounting or removing of the heating device to/from the hot runner nozzle. The thermocouple can thereby move out of the recess, whereby on the one hand the thermo-couple's measurement result will be falsified and, on the other, the thermocouple will be jammed between the hot runner nozzle and the heating element upon the continuing of the rotational movement and in consequence even sheared off.

If the longitudinal slot exhibits a form deviating from a straight line, a device such as a thermocouple arranged in a straight line on the hot runner nozzle cannot enter into the longitudinal slot. Nor can a device exhibiting a form deviating from a straight line or arranged at an inclination to the longitudinal axis of the hot runner nozzle enter into a longitudinal slot which is arranged in the direction of the longitudinal axis of the heating unit or the hot runner nozzle. By utilizing one of the advantageously indicated embodiments, the at least one longitudinal slot of the heating device can be configured such that, due to its geometry, no element arranged on the hot runner nozzle can enter into said longitudinal slot.

In a further preferred embodiment, the width of the longitudinal slot varies along the length of the slot. This embodiment as well can advantageously prevent devices arranged within the diameter of the heating device from entering into the longitudinal slot upon a rotation of the heating device if it exhibits a form differing from the element radially arranged within. Damage to elements arranged within the heating device can thus be prevented by the appropriate design and configuration of the longitudinal slot.

Preferably the closed end of the at least one first longitudinal slot is disposed adjacent to a front end region of the hot runner nozzle during operation—when the heating device is thus mounted on a hot runner nozzle. The front end region of the hot runner nozzle is the area which is arranged at the entry opening of the cavity and thus an area of increased heating because of the increased thermal outflow there particularly into the mold. The closed end of the at least one first longitudinal slot forms a first bridge in the heating unit. The wall of the heating unit is closed by the bridge, making the heating unit unable to open in this area adjacent a first longitudinal slot. The inner diameter of the heating unit in the area of the first bridge thereby remains unaffected by the longitudinal slot terminating there. This thus enables good contact between the heating unit and the hot runner nozzle and, in particular with an arrangement of the bridge in a front end region of the hot runner nozzle, good heat transfer at a uniform thermal profile.

In one preferential embodiment of the heating device, the heating unit exhibits a second longitudinal slot which likewise extends less in the longitudinal direction than the length of the heating unit. The closed end of this second longitudinal slot is arranged on the first face side of the heating unit so as to form a second bridge. The bridges of the longitudinal slots thereby limit an enlargement of the inner diameter of the heating unit preferably at the two ends of said heating unit.

It is however also possible for the closed end of the second longitudinal slot, as with the closed end of the first longitudinal slot, to be arranged on one face side of the heating device. In such an embodiment, the end region of the heating unit comprising the two bridges forms a closed ring around the hot runner nozzle in operation, whereby a particularly large contact area is enabled between the hot runner nozzle and the heating unit and thus a good heat transfer in said end region of the heating unit. Due to the larger thermal outflow into the mold, this is particularly favorable when the heating device is mounted on the hot runner nozzle such that the two bridges are arranged adjacent to the front end region of the hot runner nozzle in operation. The formation of two open ends in the other end region enables an improved enlargement of the inner diameter of the longitudinal slot.

One preferential embodiment provides for the closed end of the at least one second longitudinal slot arranged on the heating unit to be disposed adjacent to a rear end region of the hot runner nozzle in operation. The rear end region of the hot runner nozzle is the area with which the hot runner nozzle is mounted to the hot runner manifold block. The closed end of the second longitudinal slot forms a second bridge in the heating unit. Thus the wall of the heating unit also cannot open in the area of the second bridge and the inner diameter of the heating unit in the area of the second bridge thereby remains unaffected by the longitudinal slot terminating there, whereby in particular also a uniform thermal profile and good heat transfer is made possible.

By a first bridge being formed at the closed end of a first longitudinal slot as well as a second bridge at the closed end of a second longitudinal slot—respectively arranged at opposite ends of the heating unit—the heating unit is only interrupted in the area of its two ends by the respective one of the two longitudinal slots. Thus the heating unit largely encloses a hot runner nozzle in this area after being mounted to same. This results in high dimensional stability to the heating unit as a whole and in particular its end regions.

This increased dimensional stability due to the formation of a closed end on a longitudinal slot also results in advantages even during the manufacturing of the heating unit. As noted above, the wall inclines in the edge area of a continuous longitudinal slot to assume a smaller curvature and thus a larger inner diameter. A continuous longitudinal slot thereby also results in an unwanted enlargement of the outer circumference of the heating unit. Such an enlargement results in increased requirements with respect to a heating element being wrapped around the heating unit and, due to the reduced contact area, leads to a degradation in the heat transfer between the heating unit and the hot runner nozzle during operation. In order to lessen such an enlargement of the heating unit diameter at the continuous longitudinal slot, known solutions for heating units utilize high-quality materials with low residual stress, such as for example raw forgings with which such deformations are less pronounced. A longitudinal slot design with a closed end thus in particular also enables the use of more economical materials in the manufacturing of heating units.

The inclination of a longitudinal slot opening decreases in the direction of its closed end. The inherent stability of a heating unit in the area of longitudinal slots is thus greater in the direction of their closed ends. The opposite arrangement of the first and second longitudinal slots in relation to the longitudinal extension of the heating unit thus achieves an advantageous design particularly with respect to the material load of the heating unit and hence good inherent stability of the heating unit. This results in particular in good contact between the heating unit and the hot runner nozzle during operation.

The formation of the first and preferably second bridge limits a raising of the wall and thus also an enlargement of the inner diameter of the heating unit preferentially on both ends of the heating unit which correspond to the outer diameter of the front and the rear end region of the hot runner nozzle. An enlarging of the inner diameter of the heating unit in the area of a longitudinal slot, i.e. in particular in the area of the heating unit adjacent the longitudinal slot in the circumferential direction, results in particular in a decrease at that point in the contact area between the inner surface of the heating unit and the exterior surface of the hot runner nozzle, whereby the heat transfer between the heating unit and the hot runner nozzle degrades accordingly. Thus an enlargement of the inner diameter of the heating unit, particularly in an area in which a temperature detecting section of a thermocouple is arranged on the heating unit to detect the temperature at the hot runner nozzle, can falsify the temperature measurement value.

The mounting and removal of a heating unit to/from a hot runner nozzle is facilitated particularly by the possibility of temporarily enlarging the inner diameter of the heating unit, preferably in the area of at least one longitudinal slot arranged therein. Such a temporary enlargement of the inner diameter can dissolve a bond existing between the outer surface of the hot runner nozzle and the inner surface of the heating unit. One possibility for enlarging the inner diameter of the heating unit is yielded by the at least one longitudinal slot disposed in the heating unit and in particular by its open end. The closer an area of the heating unit is to the open end of a longitudinal slot, the more the heating unit in this area can expand due to the thermal expansion of the hot runner nozzle or by means of a tool inserted into this area of the slot and thus the inner diameter of the heating unit can also be enlarged in this area.

A suitable tool for expanding the slot is preferably of wedge-shaped design. One preferred embodiment has an end with two opposite somewhat inclined surfaces, their largest transverse extension being slightly larger than the extension of the longitudinal slot width, with a varying width particularly the smallest extension thereof. Such a tool is inserted at a suitable area, in particular at the open end of the longitudinal slot, and moved in its longitudinal direction. The longitudinal slot thereby opens in accordance with the advancing of the tool toward the closed end of said longitudinal slot. The closer an area of a longitudinal slot is to its closed end, the more the bridge at its closed end works against the longitudinal slot being opened and thus an enlarging of the heating unit inner diameter. A screwdriver with a front end wider than the slot can, however, also be used as a tool for expanding a longitudinal slot. The screwdriver is thereby placed in a longitudinal slot perpendicular to the outer surface of the heating unit. The longitudinal slot can be expanded by then rotating the screwdriver.

The heating unit of the inventive heating device further exhibits a channel disposed in the outer surface of the heating unit. The channel is preferentially recessed in the outer surface of the heating unit particularly by means of a milling or forming process. Depending on the heating unit's manufacturing method, the channel can also be produced in master forming processes such as casting or pressing with subsequent sintering or in generating processes such as selective laser sintering of the heating unit. The channel in particular comprises one bottom surface and two side walls. The bottom surface and the two side walls of the channel do not, however, have to be geometrically separated from one another in the sense of the invention. Further suitable configurations in which for example at least one lateral surface also gives way without transition to the bottom surface, such as for example in the case of a semicircular channel cross section, are also conceivable. Designated the bottom surface is thereby the area of a channel which exhibits the smallest distance from the inner diameter of the heating unit. Designated as lateral surfaces are those areas which border the outer surface of the heating unit.

The channel runs wound around the heating unit. The channel is thereby preferably wound around the heating unit in coiled form and can preferably exhibit different pitches, at least in portions. The channel thereby runs at least once completely around the heating unit and also crosses the at least one longitudinal slot at least once. The channel is preferably provided to receive a preferentially elongated heating element. The channel preferably runs in the outer surface of the heating unit such that a large section of the heating element corresponding to the intended heat input is arranged on the outer surface of the heating unit. This means that in sections in which more thermal energy is to be transferred to the hot runner nozzle, the pitch to the winding is smaller so that the channel exhibits more windings at that point, and in areas in which the hot runner nozzle will be subjected to less heat, the pitch to the winding is greater so that the channel exhibits fewer windings at that point. The channel can thereby in particular also run lengthwise to the heating unit.

A removable heating device for a hot runner nozzle according to the invention comprises an electrical heating element. The electrical heating element comprises a heater wire which is preferably arranged in a heater housing. The heater housing is at least partially disposed in the channel. The heating element can thereby be arranged singly or also doubly in the channel, preferably in two adjacent positions.

In a single arrangement of a heating element in the channel, the channel preferably adapted to the cross section of the heating element leads over the outer surface of the heating unit such that the channel guides the two ends of a heating element arranged therein into respectively appropriate positions to lead to a power supply connection. In a double arrangement of a heating element in the channel, the channel preferably adapted to the cross section of two adjacent heating elements is designed so as to exhibit an initial configuration at an end region of the heating unit which is suited to receive a 180° loop of the heating element. The channel guides the heating element in the form of two adjacently arranged heater housings from said one end region preferably to the opposite end region of the heating unit and at that point to an appropriate position to lead the two ends of the heating element particularly to a heating element connection to a power supply. Heating elements with only one connector end to a power supply can also be used in like manner. The channel is hereby preferably adapted to the cross section of a heating element. Such a heating element with only one connector end then terminates preferably at the end region of the channel facing away from the connecting side, preferentially configured without a 180° loop.

In one preferential embodiment, the 180° loop of the heating element is arranged in the end region of the first bridge of the heating unit, and the end of the channel which leads the heating element away from the heating unit in the other end region of the heating unit. This enables good temperature control particularly of the front end region of a hot runner nozzle as well as good accessibility to the heating element connections.

The heating element can thereby be conducted in the channel in form-locking manner, whereby it can preferably also move freely with respect to the channel for example upon an expanding of at least one longitudinal slot. It can, however, also be at least partly conducted in the channel in force-locking manner. Thus, it can also be pressed into the channel, for example to enable a larger contact area between the heater housing and the surface of the channel. A form-locking conducting can thereby also be designed such that an in particular longitudinal movement of the heating element relative the channel is also possible.

The heater housing is in direct contact with the bottom surface and at least one of the two side walls in order to transmit the heat generated by the heater wire through the contact between the inner surface of the heating unit and the outer surface of the hot runner nozzle to same. The heating element is disposed on the heating unit and in particular the channel formed thereon such that the best contact possible is made between the heating unit and the heating element. This thereby achieves transmitting of the largest possible portion of the heat generated by the heating element to the heating unit and in particular to the hot runner nozzle.

The heating element is wound around the heating unit in close contact and thereby runs in particular in the channel provided for same. Thus the heating element, which preferably has relatively low longitudinal elasticity and encloses the outer surface of the heating unit, limits a radial expansion and in particular an enlargement of the inner diameter of the heater housing. Such an enlargement of the inner diameter of the heating unit can in particular be achieved by expanding a longitudinal slot with a tool, which is made possible by the absence of a connection between the two sides of the longitudinal slot at its open end. Such an opening of the longitudinal slot is in particular associated with an enlargement of the outer circumference of the heating unit, in particular by the edges of the longitudinal slot raising off the outer diameter of the hot runner nozzle. Such an enlargement of the outer circumference leads to stressing of the heating element particularly in its longitudinal direction and in particular in the areas of the heating element which cross a longitudinal slot. Thus, the heating element preferably works that much more pursuant to its longitudinal elasticity to counter an opening of the longitudinal slot the greater the number of heating element windings in this area around the outer surface of the heating unit.

Preferably the heater housing further consists of a material which exhibits a lower thermal expansion coefficient than the material of the heating unit. When using such a heating element, particularly the opening of a longitudinal slot due to thermal load during operation is thus limited and thereby in particular an enlarging of the outer circumference of the heating unit beyond the actual thermal expansion. This in particular also prevents a raising of the inner surface of the heating unit areas along a longitudinal slot particularly by an enlarging of the inner diameter in said area, which leads to a large contact area between the inner surface of the heating unit and the outer surface of the hot runner nozzle and thus also contributes to the formation of a favorable heat transfer profile between the heating unit and the hot runner nozzle. Thus, the heating element also limits a mechanically induced radial expansion of the heating unit in the area of a longitudinal slot. In addition, a plastic deformation of the heating unit in the area of a longitudinal slot due to excessive mechanical action while the heating unit is being removed is thereby prevented.

In one preferred embodiment of the heating device, two longitudinal slots formed on the heating unit are arranged substantially diametrically opposite in relation to the heating unit axis. In such an arrangement of the longitudinal slots, the areas between the two longitudinal slots are in each case of substantially the same size and preferably exhibit substantially the form of hollow cylindrical half shells. Upon dissolving the bond which develops between the heating unit and the hot runner nozzle during removal of the heating device by an expanding of the two longitudinal slots, preferably no area of the heating unit inner surface in this configuration is more than 90° away from one of the longitudinal slots in relation to the heating unit axis, whereby the dissolving of a bond between heating unit and hot runner nozzle is simplified. If only one longitudinal slot is accessible to a tool for removing the heating device, the two opposite areas of the heating unit can then at least move against each other at a non-accessible longitudinal slot so that a configuration with diametrically opposed longitudinal slots in relation to the heating unit axis is also advantageous in this case.

In a further preferred embodiment of the heating device, same exhibits two further longitudinal slots. Additionally to the advantages already noted for the first and second longitudinal slot, these two further longitudinal slots enable the heating unit to be expanded at further longitudinal slot positions circumferentially arranged on the heating device. By so doing, the inner diameter of the heating unit can also be increased at these positions, at least in sections, and thus the contact area between the inner surface of the heating unit and the outer surface of the hot runner nozzle reduced even more effectively so as to dissolve a bond between said surfaces.

It is thereby possible for the closed ends of the two further longitudinal slots to be arranged adjacent to the front end region of the hot runner nozzle during operation. In such an embodiment, the two additional longitudinal slots do not interrupt said end region of the heating unit in which the two bridges are formed, whereby despite the additional longitudinal slots, a large contact area is enabled between the hot runner nozzle and the heating unit and thus a good transfer of heat in this end region of the heating unit. The forming of two additional open ends in the opposite end region further enables an improved enlargement of the inner diameter of the longitudinal slot for removing the heating unit from the hot runner nozzle.

In one preferential embodiment of the heating unit, the closed end of the one longitudinal slot of said two additional longitudinal slots is arranged adjacent to the front end region of the hot runner nozzle during operation and the closed end of the other longitudinal slot is arranged adjacent to the rear end region of the hot runner nozzle during operation. The advantages of such an opposing arrangement of the closed ends such as in particular the dimensional stability of the heating unit and the accessibility for removal have already been detailed above. In this respect, reference is made at this point to the cited advantages without reiterating same.

By additionally positioning two further longitudinal slots, the heating unit of a preferred embodiment exhibits four longitudinal slots. However, by additionally disposing two further longitudinal slots on a heating unit previously having one longitudinal slot, a heating unit comprising a total of three longitudinal slots can also be formed. The invention is however not to be limited to embodiments of one, two, three or four longitudinal slots, in fact embodiments having more than four longitudinal slots, particularly five, six, seven or even eight longitudinal slots distributed around the circumference of the heating unit, are conceivable. The configuration with respect to number, geometry and arrangement of the longitudinal slots particularly as regards the distribution on the circumference and the configuration of the closed ends, ensues preferably contingent upon the desired heat transfer profile and the desired properties with respect to removal.

Deemed an additional advantage of a configuration having a plurality of longitudinal slots is that in the case of reduced accessibility of one or more longitudinal slots when the heating unit is being removed with a tool, the heating unit can move at least in the area of one or more other longitudinal slots.

In a further preferred development of the heating device, the two further longitudinal slots are disposed substantially diametrically opposite in relation to the heating unit axis. Particularly in conjunction with a development in which the first and the second longitudinal slot are likewise disposed to be substantially diametrically opposite, the areas between in particular each two longitudinal slots respectively are substantially the same size. These two additional, diametrically opposed longitudinal slots can thereby likewise be expanded by a tool on opposite sides of the heating unit, whereby a dissolving of the bond between the inner diameter of the heating unit and the outer diameter of the hot runner nozzle is further facilitated particularly when using a tool for expanding the longitudinal slot.

In a further preferential embodiment of the heating device, the two further longitudinal slots are disposed offset to the first and/or the second longitudinal slot by 90° relative to the heating unit axis. In this type of development, the longitudinal slots have a certain distance from one another. Thus the inner diameter of longitudinal slots distanced from one another can be increased, which in particular also simplifies the loosening of a bond between the heating unit and the hot runner nozzle. The removal is thereby facilitated particularly in conjunction with a development in which the first and the second as well as both further longitudinal slots are disposed substantially diametrically opposite. In this type of development, the area between the two longitudinal slots is respectively of substantially the same size and preferably exhibits substantially the form of hollow cylindrical quarter shells. In dissolving a bond between the heating unit and the hot runner nozzle when removing the heating device by expanding the longitudinal slots, there is thus no area of the heating unit which is more than 45° away from one of the longitudinal slots relative its longitudinal axis.

The above-cited advantages when removing the heating unit from the hot runner nozzle result in general, particularly in the case of an embodiment of the heating unit in which a plurality of longitudinal slots are arranged in substantially even distribution over the circumference of the heating unit. Such a design additionally enables a uniform heat transfer profile to form over the inner peripheral surface of the heating unit.

In a further preferred embodiment of the heating device, the closed ends of the longitudinal slots on the face sides are arranged respectively alternatingly adjacent to the front and the rear end region of the hot runner nozzle during operation. This alternating arrangement enables an open end to be arranged in the end regions of the heating unit only in the area of each second longitudinal slot. This enables—due to the bridges arranged therebetween—a comparatively good dimensional stability of the heating unit and in particular of its end regions.

To accomplish the object, a removable heater/thermocouple assembly for a hot runner nozzle is further proposed which comprises at least one heating device of the type described above and a thermocouple having a temperature detecting section. Such thermocouples serve in detecting the temperature at the hot runner nozzle, particularly also the temperature in the area of the nozzle tip. The temperature detecting section is normally arranged at one end of a thermocouple. The thermocouple can therefore be guided to the nozzle within a recess in the hot runner nozzle itself, in a recess of the heating device or the heating unit respectively or externally of the heating device.

In one preferential further development, the thermocouple is arranged on the heating unit. The arrangement is preferentially realized such that free access to at least one longitudinal slot is possible for a tool for removing the heater/thermocouple assembly, without the tool thereby touching the thermocouple. The temperature detecting section of the thermocouple is thereby arranged such that the temperature in the front end region of the hot runner nozzle can thus be measured. The heating unit with the thermocouple can be removed by expanding at least one longitudinal slot with a tool, wherein by expanding the longitudinal slot, a bond which has developed between the heating unit and the hot runner nozzle during operation can be dissolved.

The inventive removable heater/thermocouple assembly for a hot runner nozzle comprises at least one thermocouple having a temperature detecting section. The temperature detecting section of the at least one thermocouple is thereby preferably disposed such that it measures the temperature in the front end region of the hot runner nozzle. Detecting the temperature in this area is particularly important as the heating unit is not in contact with the entire front end region and, to ensure good workpiece quality, particularly the nozzle tip and the temperature of the melt should be within a specific range particularly contingent upon the material of the melt. The temperature detecting section is therefore preferably disposed such that it can measure the temperature at the hot runner nozzle as directly as possible.

One preferential embodiment of the heater/thermocouple assembly comprises at least one second thermocouple which is preferably disposed on the heating unit such that it measures the temperature in substantially the same area of the hot runner nozzle as the first thermocouple in the sense of a redundant arrangement and thus can provide the required measurement values particularly should the first thermocouple malfunction. It is however also preferred to dispose one or more additional thermocouples on the heating unit of the heater/thermocouple assembly which measure the temperatures particularly in different areas of the hot runner nozzle. Particularly to be considered when arranging further heating elements is the accessibility of at least one longitudinal slot for the removal of the heating unit.

Preferably the at least one thermocouple can be arranged on the heating unit so as to be removable in the event it for example needs to be replaced due to damage.

The at least one thermocouple is arranged on the heating unit such that a tool has free access at least to one longitudinal slot. There is thus no danger of damaging a thermocouple when using a tool to expand a longitudinal slot, particularly in order to remove the heater/thermocouple assembly from the hot runner nozzle. This thereby prevents damaging a thermocouple by the acting forces of the tool when expanding a longitudinal slot, particularly impact, frictional or compressive forces transmitted to a thermocouple disposed in a longitudinal slot.

The at least one thermocouple is further preferably arranged on the heating unit so as to not be in direct contact with the heating element in order to not impact the temperature detection particularly by unwanted input of heat. On the other hand, directly arranging a thermocouple on the heating element can also lead to damaging the thermocouple upon removal due to the contact between the heating element and the heating unit in that the electrical heating element limits the radial expansion of the heating unit.

To aid in the removal of the heating unit with the at least one thermocouple, at least one longitudinal slot of the heating unit can be expanded. Upon expanding a slot, particularly the inner diameter of the heating unit enlarges at least in an area extending away from the longitudinal slot being worked on by the tool. The contact area between the inner surface of the heating unit and the outer surface of the hot runner nozzle thereby reduces at least temporarily. Particularly the deformation of the heating unit in the area of a longitudinal slot caused by the tool, which in particular raises an area of the inner surface of the heating unit from an area of the outer surface of the hot runner nozzle and/or displaces these areas relative each other to a certain extent, leads to dissolving a bond developed between the heating unit and the hot runner nozzle particularly during the operation of the injection molding machine.

In a further preferential embodiment of the heater/thermocouple assembly, at least one thermocouple is disposed in one of the longitudinal slots of the heating unit. As noted above, to protect against damage, a thermocouple is preferably not arranged on the heating unit so as to be in direct contact with the heating element. On the other hand, a thermocouple should preferably be disposed on the heating unit so as to be removable in order to be able to be replaced particularly in the event of damage and/or malfunction. Therefore, it is particularly preferential in a design of a heater/thermocouple assembly having a plurality of longitudinal slots for at least one thermocouple to be arranged in one of the longitudinal slots so as to be easily accessible. To remove the heater/thermocouple assembly, it is preferential in this case to insert the tool only in the longitudinal slots in which no thermocouple is disposed in order to prevent damaging a thermocouple.

In a further preferential embodiment of the heater/thermocouple assembly, the temperature detecting section which is preferably arranged at the thermocouple front end of one said thermocouple is disposed in a recess in the heating unit or preferably led through a recess to the hot runner nozzle. Such a recess is preferentially disposed in the end region of the heating unit which is arranged adjacent to a front end of the hot runner nozzle during operation so as to measure in particular the temperature in the end region of the hot runner nozzle, in particular close to the nozzle tip.

Such a recess, which receives an end region of a thermocouple and in particular the temperature detecting section of a thermocouple, is preferably formed in the area of a first bridge or in the circumferential direction alongside it. The first longitudinal slot lends itself in particular to this due to the direct proximity of the first bridge when the thermocouple is disposed in same. Such a recess can be a recess closed to the outer surface of the heating unit, as for example a blind hole, whereby with such an embodiment, the recess can also be configured in a temperature detecting unit which preferably has good heat-conducting properties and is inserted into the heating unit so as to enable particularly good acquiring of measurement values.

The recess can however particularly also be designed open to the face side of the heating unit or to its inner surface and thus to the hot runner nozzle, wherein the temperature detecting section of the thermocouple is preferably arranged directly at the opening of the recess or guided to the hot runner nozzle. It is thereby just as possible for the hot runner nozzle to exhibit a recess in its outer surface into which the temperature detecting section of the thermocouple can be inserted in order to better measure the temperature of the hot runner nozzle and/or the melt in the hot runner nozzle. In such a preferential configuration, the heater/thermocouple assembly comprises at least one recess through which a thermocouple can be guided to the hot runner nozzle, in a preferred embodiment to a position which corresponds in the mounted state to the position of the recess in the hot runner nozzle provided for receiving a temperature detecting section.

In one preferred embodiment of the heater/thermocouple assembly, same is connected to a control device which in particular is fed measurement signals from one or more thermocouples. In the context of controlling and/or regulating the thermal output, the control device compares the temperature values derived from the measurement signals supplied by the thermocouple(s) to the respective target temperature value of the area of one or more temperature detecting sections on the hot runner nozzle. The control device calculates the necessary heating current for the heating element of the heater/thermocouple assembly from the difference between the measured temperature values and the target temperature values and thus controls and/or regulates its thermal output.

Further advantages, features and possible applications of the present invention ensue from the following description in conjunction with the figures.

BRIEF DESCRIPTION OF THE DRAWINGS

FIG. 6a: a further illustrative heating device having stepped longitudinal slots prior to mounting on a hot runner nozzle;

FIG. 6b: the illustrative heating device of FIG. 6a in mounted state on the hot runner nozzle;

FIG. 8: an illustrative heater/thermocouple assembly comprising the heating unit from FIG. 2a;

FIG. 10: an illustrative heater/thermocouple assembly arranged on a hot runner nozzle;

DETAILED DESCRIPTION

Figure 1:
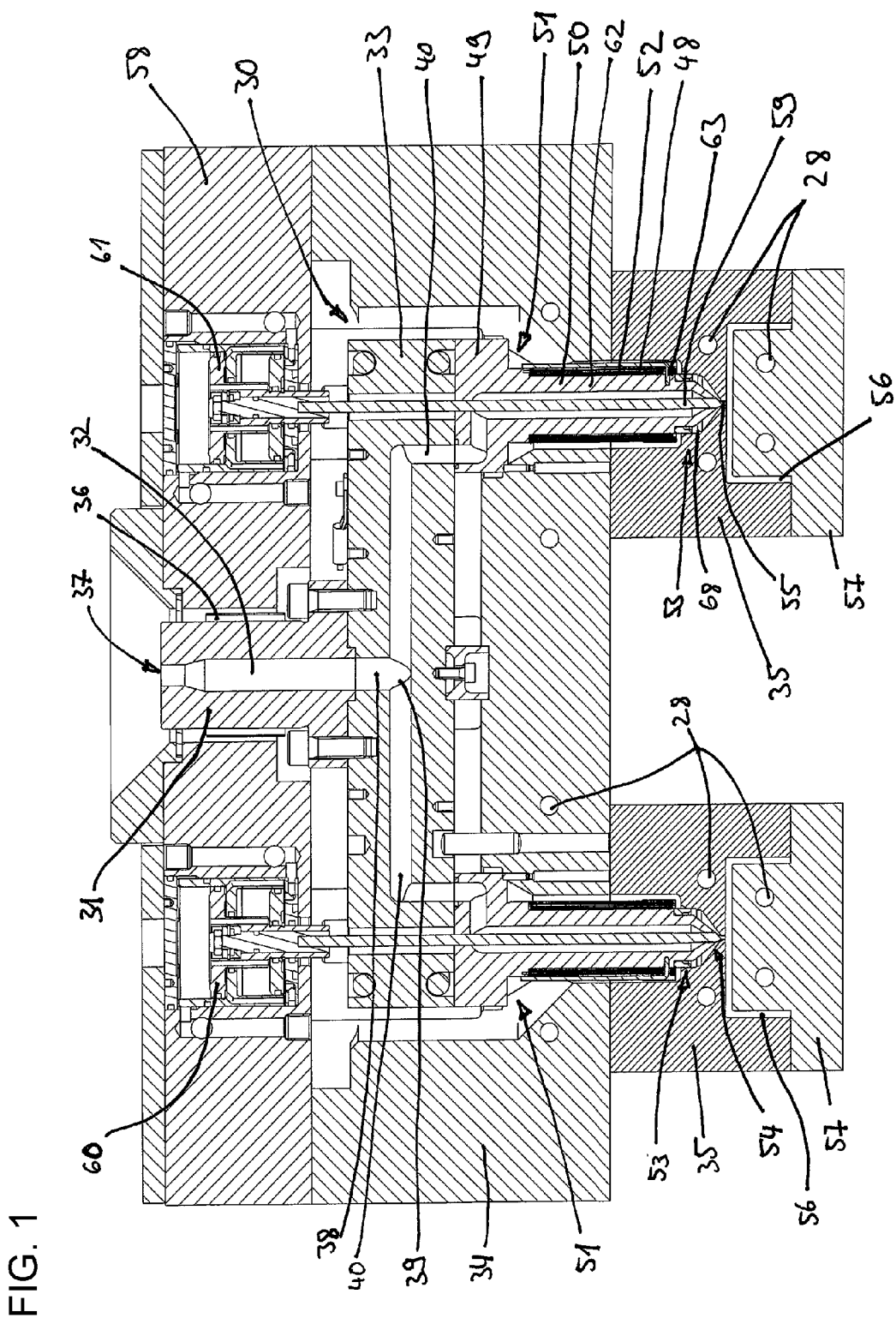
FIG. 1: a sectional view of part of an illustrative hot runner injection molding machine in which an illustrative heating device and heater thermo-couple arrangement are implemented.

FIG. 1 shows a sectional view of part of an illustrative hot runner injection molding machine comprising a hot runner system 30. The hot runner system 30 thereby comprises a hot runner manifold block 33 as well as a plurality of hot runner nozzles 50, for example two in the present depiction. The injection nozzle (not shown) is connected via machine bushing 31 and via the hot runner manifold block 33 to for example two hot runner nozzles 50. The hot runner nozzles 50 respectively empty into a mold which are each composed of a mold insert 35 and a mold core 57. The mold insert 35 and the mold core 57 respectively enclose a cavity 56 arranged therein.

The machine bushing 31 thereby comprises an inlet 37 facing the injection nozzle which guides the melt to the hot runner manifold block 33 via runner 32. The runner 38 disposed at that point exhibits a branching point 39 from which further runners 40 lead to the two hot runner nozzles 50 illustratively depicted in the embodiment. The hot runner nozzles 50 are connected at nozzle holder rings 49, which are arranged in the rear end region 51 of the hot runner nozzles 50, to the hot runner manifold block 33 and thereby also connected to runner 40. Each of said hot runner nozzles 50 comprises a nozzle body 62 for guiding the melt from a runner 40 in the hot runner manifold block 33 to a cavity 56. Each hot runner nozzle 50 has a valve 54 in its front end region 53, its outlet 55 connected to a cavity 56. The hot runner system 30 is arranged within a hot runner plate 34.

A plurality of heating elements 41 are arranged within the hot runner manifold block 33 which control the temperature of said hot runner manifold block 33 so as to keep the melt in the runners 38, 40 fluid or flowable respectively. The heating elements 41 can be configured as electrical heat conductors. A further heating element 36 is mounted at machine bushing 31 for controlling the temperature of runner 32.

A heating device 48 is mounted on each hot runner nozzle 50 for controlling the temperature of the molten material in the nozzle body 62. The heating device 48 is part of a heater/thermocouple assembly 52. One or more thermocouples 63 serve in the direct or indirect measuring of the temperature of the melt in the nozzle body 62 and/or in the measuring of temperatures at the nozzle body 62. The nozzle body 62 can thereby be of multi-part configuration.

An axially adjustable shut-off needle 59 is respectively arranged in each hot runner nozzle 50. A valve 54 is further respectively arranged on the front end region 53 of each hot runner nozzle 50. The shut-off needle 59 can be positioned in a shut position at the valve seat of the valve 54, its outlet 55 disposed in sealing manner at the mold insert 35.

The shut-off needles 59 run parallel to each other and are fixed to piston 61 by their ends remote of the valve seat. The pistons 61 are movably supported in the pneumatic plate 58 in the axial direction of the shut-off needles 59. By means of the pistons 61, the shut-off needles 59 are axially adjustable relative to the hot runner nozzles 50 and thus to the valves 54 into at least two positions, an open position and a closed position. The valves 54 of the hot runner nozzles 50 can thereby be opened and closed independently in order to control the volume of melt injected into each cavity 56 by the hot runner system 30.

Figure 1A:
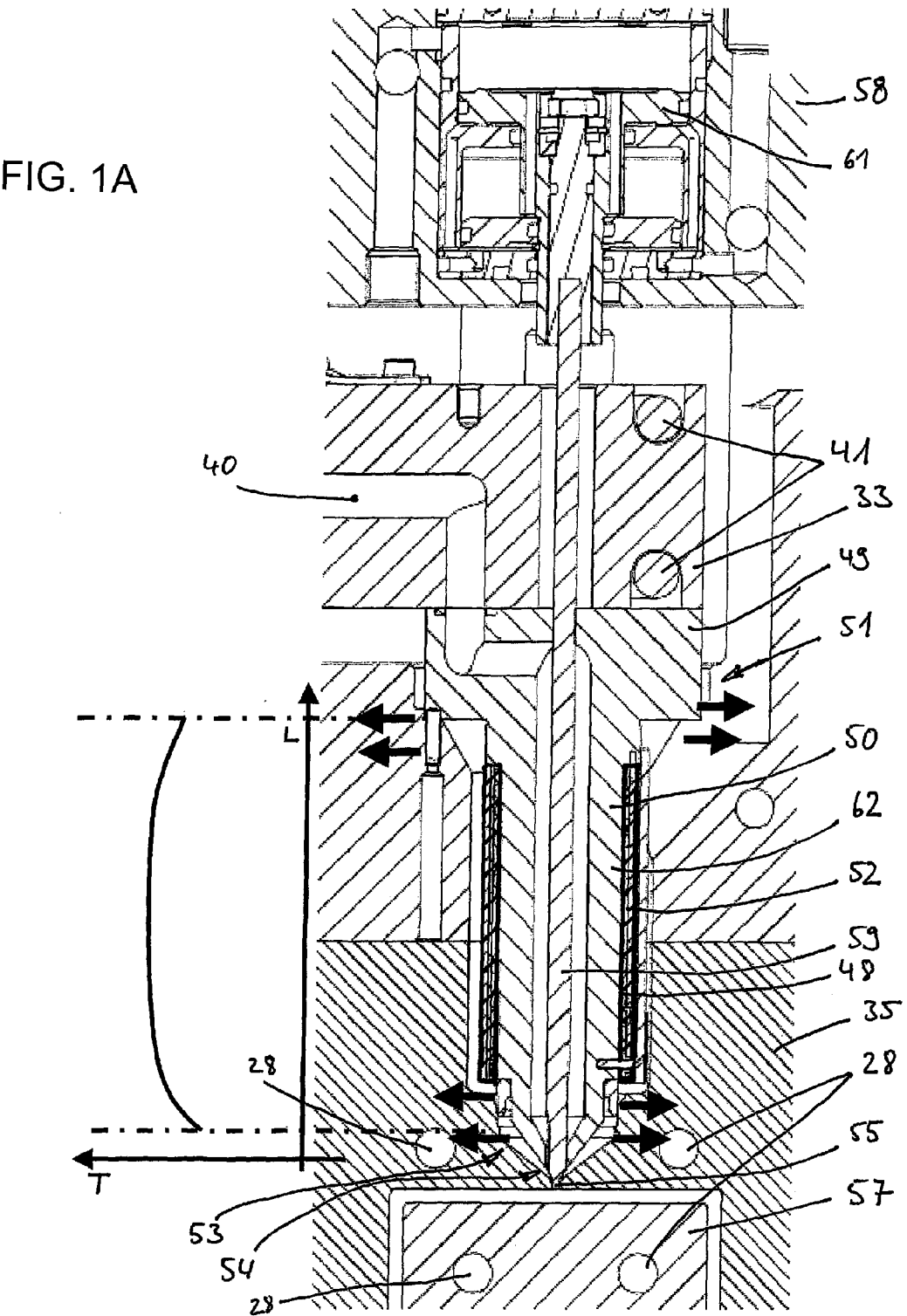
FIG. 1a: a detail from the sectional view of FIG. 1 in the area of one of the hot runner nozzles.

FIG. 1a shows a detail from the sectional view of FIG. 1 from the area of the hot runner nozzle 50 depicted on the right. A heater/thermocouple assembly 52 comprising a heating device 48 for controlling the temperature of the molten material in the nozzle body 62 is mounted on said hot runner nozzle 50. Likewise depicted is the shut-off needle 59 arranged in the hot runner nozzle 50 and movable via the piston 61, which serves on the valve in dosing the volume of melt injected into the cavity 56. The pistons 61 are movably supported in the pneumatic plate 58.

The hot runner nozzle 50 is arranged with the nozzle holder ring 49 on the hot runner manifold block 33 at its rear end region 51. The molten material is likewise supplied to the hot runner nozzle 50 in the rear end region in an opening of the runner 40 formed in the supporting ring. The melt is guided in the nozzle body 62 to the valve 54 and the outlet 55 and from there injected into the cavity 56 enclosed by the mold insert 35 and the mold core 57.

Temperature control channels 28 are arranged in the mold insert 35, in the mold core 57 as well as in the hot runner plate (see FIG. 1). The hot runner plate is cooled relative to the environment and the adjacent components by means of the temperature control channels. The temperature control channels arranged in the mold insert 35 and in the mold core 57 serve in controlling the temperature of the mold. A desired mold temperature is set by the tempering medium conveyed within these channels, which supports a directed solidifying of the melt in the cavity. In particular the component quality is thereby increased and the cycle time of the injection molding machine decreased. However, a discharge of thermal energy from the front end region 53 and the rear end region 51 of the hot runner nozzle 50 also accompanies the temperature control of the mold, or the hot runner plate respectively. This thermal outflow is symbolized in FIG. 1a by the indicated arrow in the area of the mold insert 35 next to the front end region 53. The outflow of thermal energy from the rear end region 51 of the hot runner nozzle 50 into the hot runner plate 34 is likewise symbolized by the indicated arrow next to said end region 51.

An outflow of thermal energy is unwanted especially in the front end region 51 of the hot runner nozzle 50 since the melt stored there between two injection processes needs to have a certain minimum temperature in order to not solidify prematurely in the cavity 56 during the injection process. Premature solidification of the melt prevents the mold from being completely filled, whereby the manufactured component becomes inferior or even useless. A heat shield 68 is disposed around the front end region 53 as a further measure to prevent an outflow of thermal energy from said front end region 53 of the hot runner nozzle 50, by means of which the front end 53 of the hot runner nozzle 50 is supported in the mold insert 35 recess.

A diagram on the left in FIG. 1a next to the hot runner channel 50 plots the level of the temperature T over the length L of the hot runner nozzle 50 originating from its front end region 53. As can be recognized from this diagram, the temperature is lowest in the front end region 53 of the hot runner nozzle 50. This area of the hot runner nozzle 50 is arranged adjacent to mold core 57 which, due to the tempering medium conveyed in the temperature control channels 28, exhibits a clearly lower temperature than the hot runner nozzle 50.

The heating device 48 is mounted around the circumference of the hot runner nozzle 50 and extends from a front end region 53 to a rear end region 51 of the hot runner nozzle 50. The depicted heating device 48 exhibits a higher thermal output adjacent to the front end region 53 and adjacent to the rear end region 51 of the hot runner nozzle 50 than an area situated therebetween. Despite the lower heat supply in a center area of the heating device 48, the temperature of the hot runner nozzle 50 as well as the melt therein in the area of the illustrative heating device 48 remains largely constant since the outflow of thermal energy is lowest in the center area of the heating device. The temperature drops somewhat in the area of the hot runner nozzle 50 covered by the heating device at the two end regions of said heating device 48 since the outflow of thermal energy from the hot runner nozzle 50 is already increased there.

A thermal outflow occurs into the surrounding components and/or into the environment from the areas of the hot runner nozzle 50 disposed external of the heating device 48, which leads to decreasing temperatures in the direction of the rear end region 51 and to even sharper decreasing temperatures in the direction of the front end region 53 of the hot runner nozzle 50 and thus also the temperature of the melt located in said areas.

Figure 2:
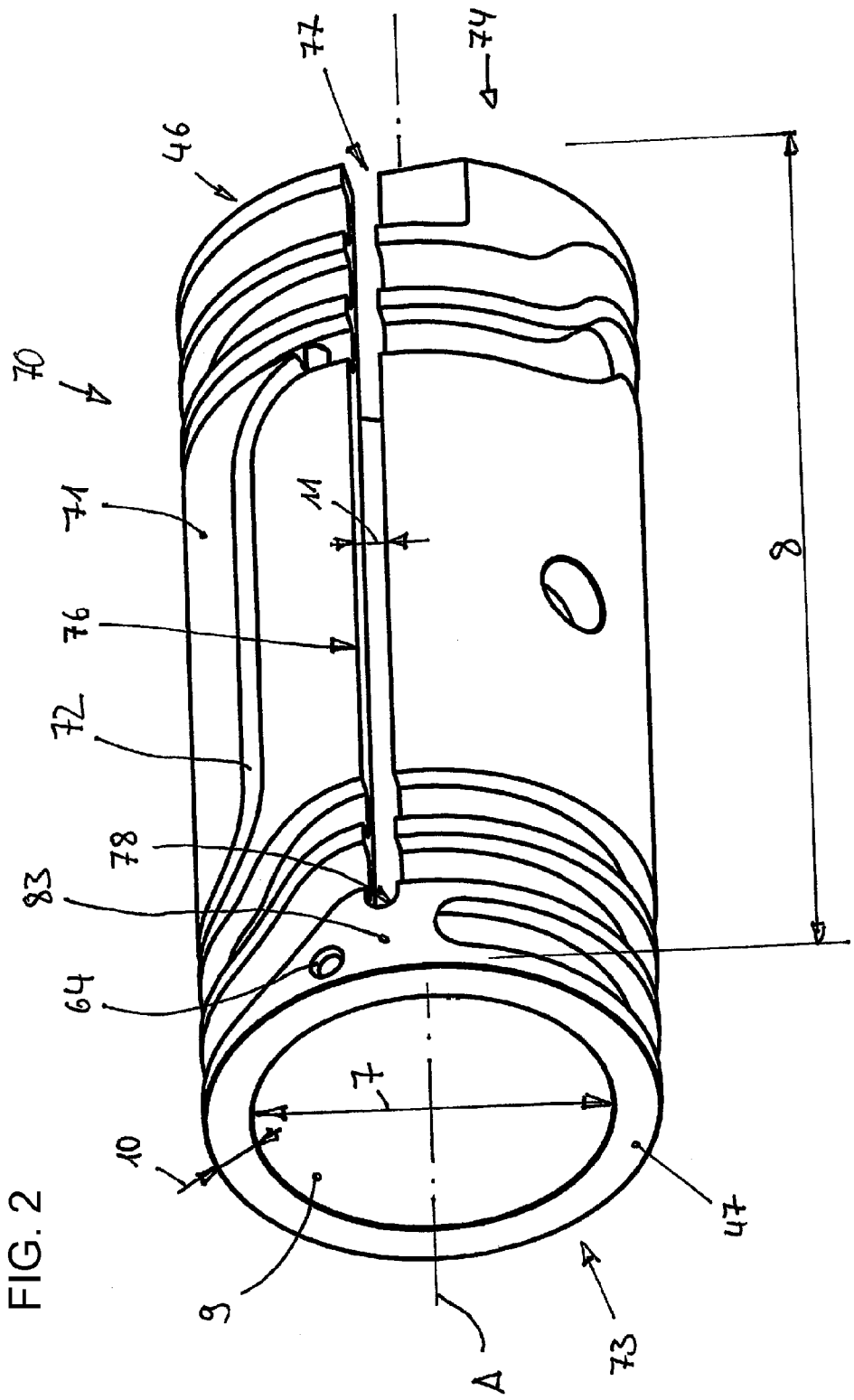
FIG. 2: an illustrative heating unit.

FIG. 2 shows an illustrative heating unit 70 of a heating device 48. The heating unit 70 exhibits an inner diameter 7, a length 8, an axis A and an inner surface 9 with which the heating unit is disposed on the outer surface of a nozzle body 62. The heating unit 70 further exhibits an outer surface 71 and a wall thickness 10. The heating unit 70 is of elongated hollow cylindrical shape. A channel 72 which winds around the heating unit 70 is milled into its outer surface 71. The channel 72 runs in the end region 73 of the heating unit 70 which is arranged adjacent to the front end region 53 of the hot runner nozzle 50 during operation as well as the end region 74 of lesser substantially helical pitch arranged opposite thereto. The channel runs substantially longitudinally to the heating unit in an area between the two end regions 73, 74. This course of the channel 72 enables a heating element inserted therein to introduce more thermal energy into the end regions 73, 74 than into the area of the heating unit 70 situated between them.

The heating unit 70 depicted in FIG. 2 further exhibits a first longitudinal slot 76 which extends over approximately 90% of the length of the heating unit 70. The longitudinal slot 76 exhibits an open end 77 on a first face side 46 of the heating unit 70 and a closed end 78 on a second face side 47. The longitudinal slot 76 forms a first bridge 83 at the closed end 78 in the end region 73 of the heating unit 70. The circumference of the heating unit 70 is thus only interrupted at one face side 46 end region 74 by the open end 77 of the longitudinal slot 76. The end region 73 arranged on face side 47 is closed. A recess 64 configured as a bore hole is further disposed in end region 73 through which the front end of a thermocouple 63 can be guided to the hot runner nozzle 50.

Figure 2A:
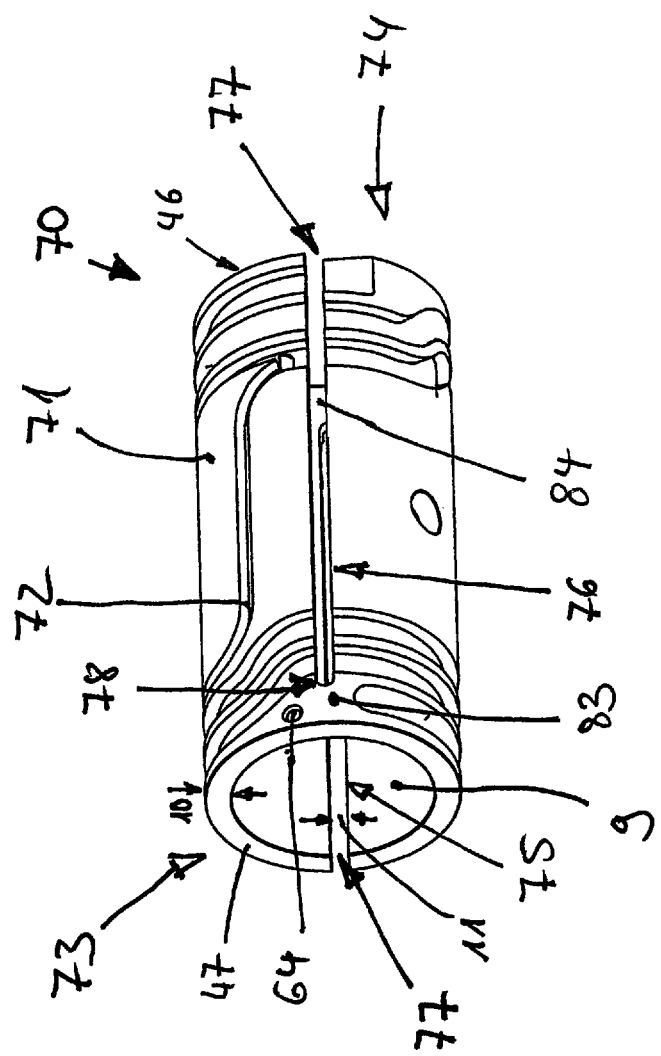
FIG. 2a: an illustrative heating unit with two longitudinal slots.

FIG. 2a shows a further illustrative heating unit 70 of a heater/thermocouple assembly 52. The heating unit 70 corresponds substantially to the illustrative heating unit 70 from FIG. 2, although exhibits a second longitudinal slot 75 which likewise extends over approximately 90% of the length of the heating unit 70 and is diametrically arranged to the first longitudinal slot 76. Thus, the heating unit 70 comprises two longitudinal slots 75 and 76. The second longitudinal slot 75 likewise exhibits an open end 77 and a closed end 78. The longitudinal slot 75 forms a second bridge 84 at the closed end 78 in the end region 74 of the heating unit 70. The circumference of the heating unit 70 is thus only interrupted on the face sides 46, 47 of the end regions 73, 74 by the respective open end 77 of one of the longitudinal slots 75, 76.

Figure 2B:
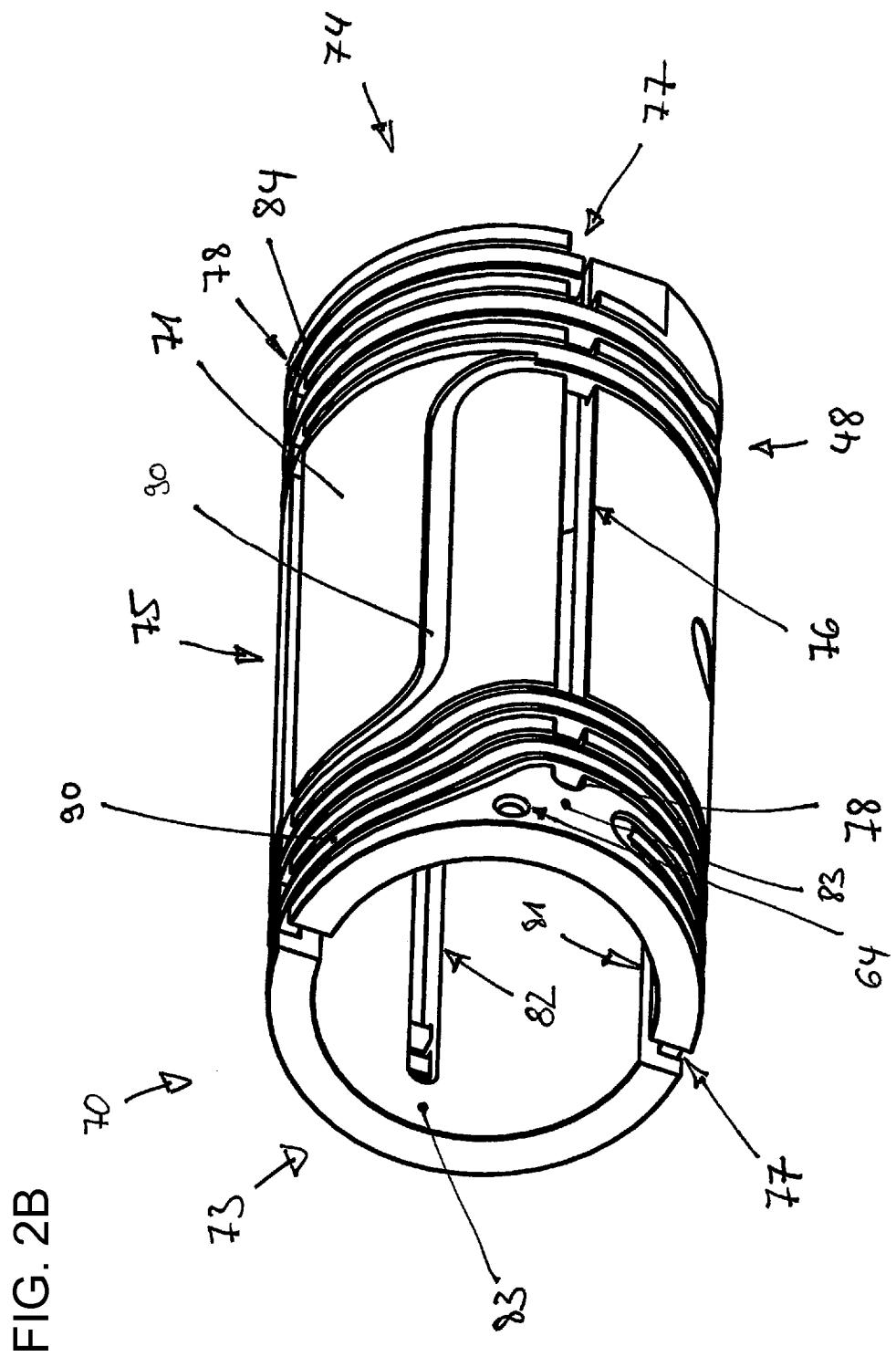
FIG. 2b: an illustrative heating unit with four longitudinal slots.

FIG. 2b shows a heating device 48 with a further illustrative heating unit 70. The heating unit 70 corresponds substantially to the illustrative heating unit 70 from FIG. 2a, although it exhibits two further longitudinal slots 81 and 82 and thus a total of four longitudinal slots 75, 76, 81, 82. The longitudinal slots are thereby arranged on the heating unit 70 such that two longitudinal slots are in each case opposite one another, their closed ends arranged in the same end region 73 or 74 of the heating unit 70. Two respective first bridges 83 and two respective second bridges 84 thus also face each other in the respective end regions of the heating unit 70. A heating element 90 is further disposed in channel 72.

Figure 3A:
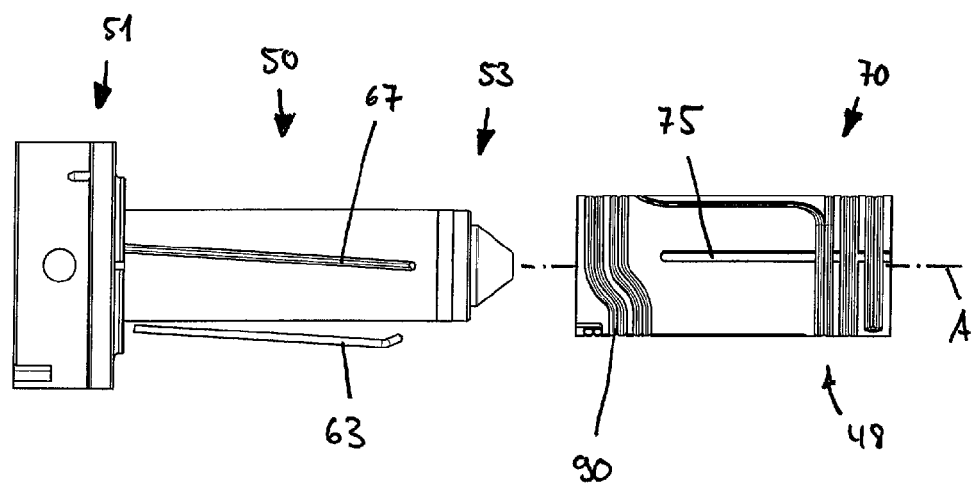
FIG. 3a: an illustrative heating device prior to mounting on a hot runner nozzle.
Figure 3B:
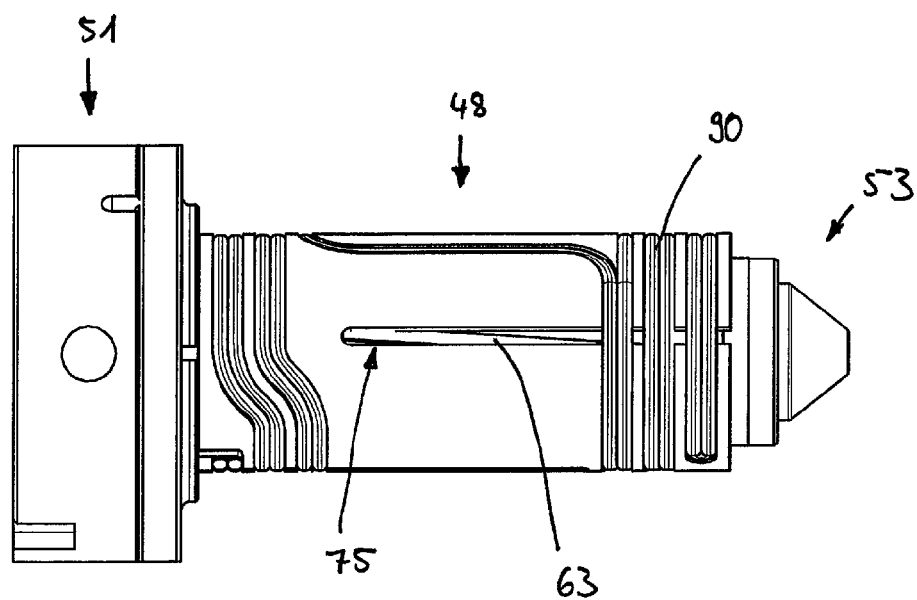
FIG. 3b: the illustrative heating device of FIG. 3a in mounted state on the hot runner nozzle.

FIG. 3a shows the heating device 48 from FIG. 2b prior to its mounting on the hot runner nozzle 50. A groove 67 disposed at an inclination to the axis of the hot runner nozzle 50 is milled into the outer surface of said hot runner nozzle 50. A thermocouple 63 is arranged in said groove 67 which is held by the heating device 48 after the heating device 48 is slipped onto the hot runner nozzle 50. FIG. 3b shows the heating device 48 fit to the hot runner nozzle 50. The heating unit 70 of the heating device 48 thereby extends from the rear end region 51 to the front end region 53 of the hot runner nozzle 50. It can be seen through the longitudinal slot 75 that the thermocouple 63 runs inside the heating unit 70 diagonally to the longitudinal slot 75. Therefore, only a short section of the thermocouple 63 is in the area of the longitudinal slot such that the thermocouple 63 cannot emerge from the groove 67. The longitudinal slot 75 of the heating device 48 is thus arranged with respect to the thermocouple 63, or to the groove 67 on the hot runner nozzle 50 respectively, such that the thermocouple 63 is reliably retained in the groove 67 by the heating unit 70.

Figure 4A:
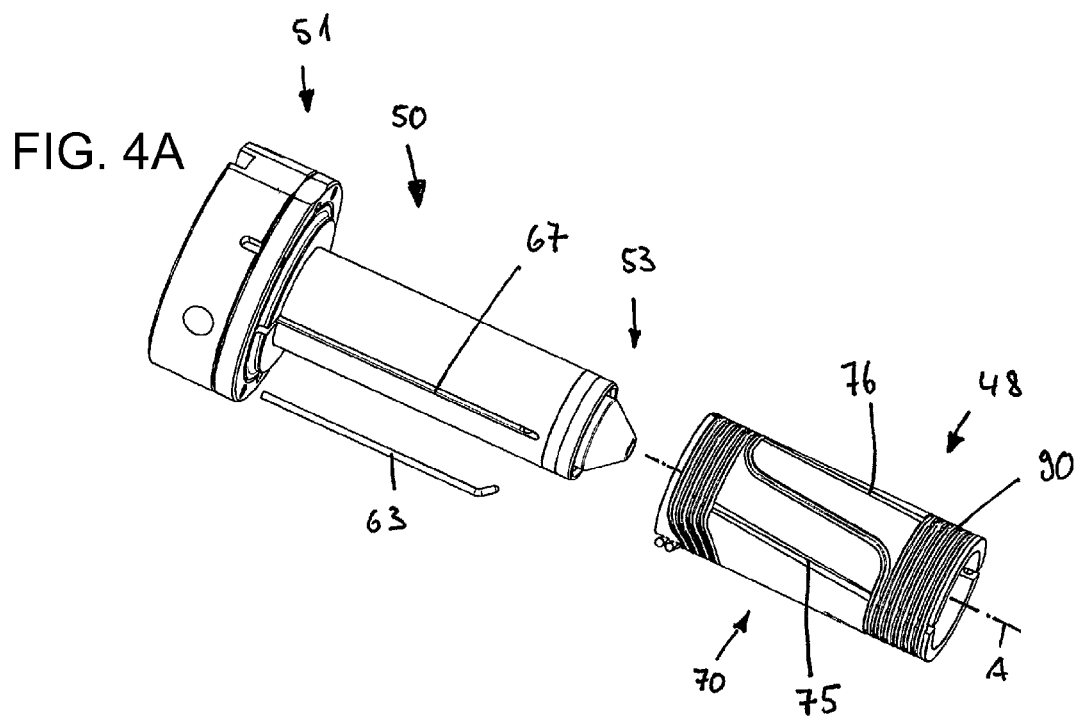
FIG. 4a: a further illustrative heating device having inclined longitudinal slots prior to mounting on a hot runner nozzle.
Figure 4B:
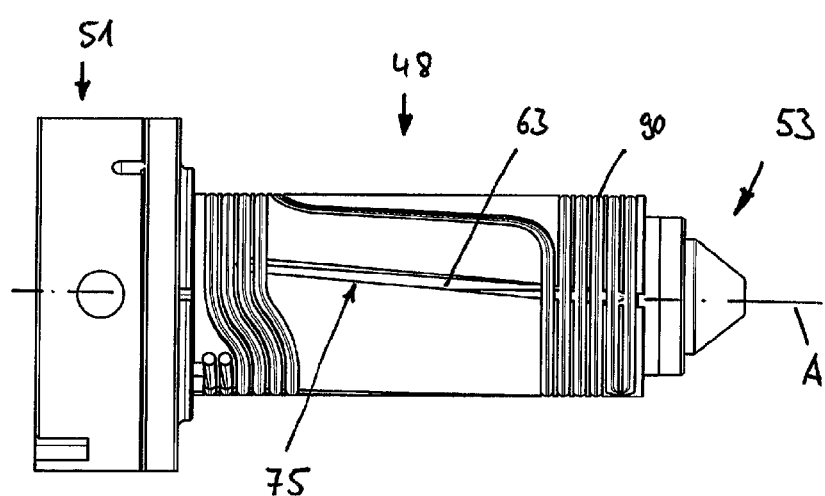
FIG. 4b: the illustrative heating device of FIG. 4a in mounted state on the hot runner nozzle.

FIG. 4a shows a further illustrative heating device 48 having two longitudinal slots 75 and two longitudinal slots 76 prior to mounting on the hot runner nozzle 50. The longitudinal slots 75, 76 of this illustrative embodiment are arranged to be inclined relative to the longitudinal axis A of the heating unit 70 by an angle of 5°. A groove 67 arranged parallel to the axis of the hot runner nozzle 50 is milled into the outer surface of said hot runner nozzle 50. A thermocouple 63 is arranged in said groove 67 which is held by the heating device 48 after the heating device 48 is slipped onto the hot runner nozzle 50. FIG. 4b shows the heating device 48 in the mounted state on the hot runner nozzle. The heating unit 70 of the heating device 48 thereby extends from the rear end region 51 to the front end region 53 of the hot runner nozzle 50. It can be seen through the longitudinal slot 75 that the longitudinal slot 75 runs diagonally to the thermocouple 63 arranged inside the heating unit 70. Only a short section of the thermocouple 63 is therefore in the area of the longitudinal slot such that the thermocouple 63 cannot emerge from the groove 67. The longitudinal slots 75, 76 of the heating device 48 are thus arranged with respect to the thermocouple 63, or to the groove 67 on the hot runner nozzle 50 respectively, such that the thermocouple 63 is reliably retained in the groove 67 by the heating unit 70.

Figure 5A:
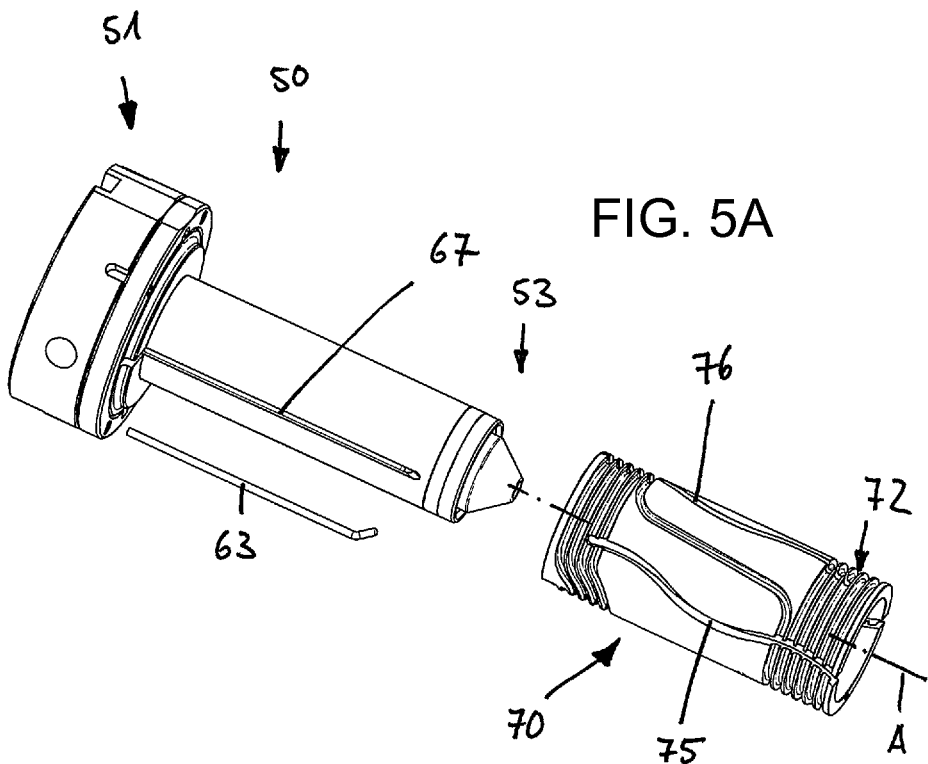
FIG. 5a: a further illustrative heating device having wave-like longitudinal slots prior to mounting on a hot runner nozzle.
Figure 5B:
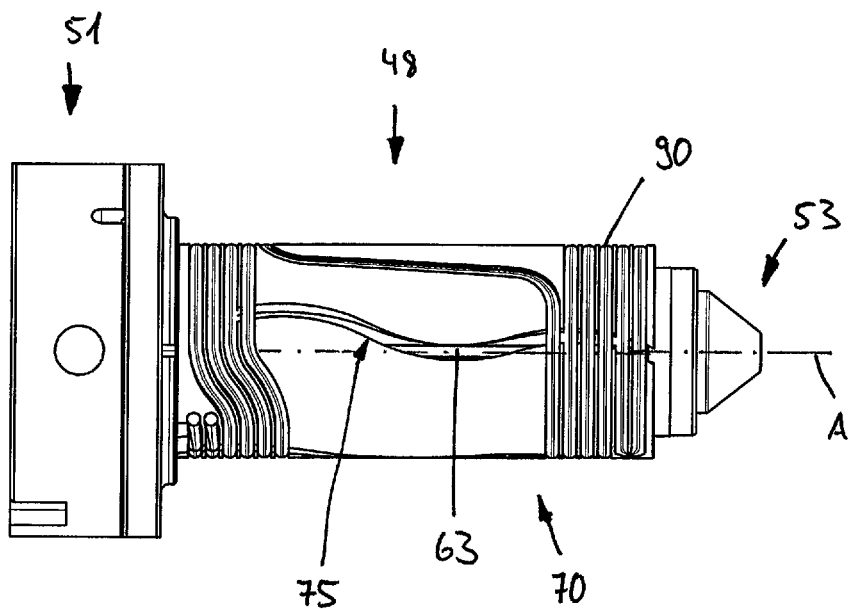
FIG. 5b: the illustrative heating device of FIG. 5a in mounted state on the hot runner nozzle.

FIG. 5a shows an illustrative heating unit 70 for a further illustrative heating device having two longitudinal slots 75 and two longitudinal slots 76 prior to its mounting on the hot runner nozzle 50. The longitudinal slots 75, 76 of this illustrative embodiment exhibit a wave-like form, the amplitude increasing toward the rear area 51 of the hot runner nozzle 50. A groove 67 arranged parallel to the axis of the hot runner nozzle 50 is milled into the outer surface of said hot runner nozzle 50. A thermocouple 63 is arranged in said groove 67 which is held by the heating device 48 after the heating device 48 is slipped onto the hot runner nozzle 50. FIG. 5b shows the heating device 48 in the mounted state to the hot runner nozzle 50. The heating unit 70 of the heating device 48 thereby extends from the rear end region 51 to the front end region 53 of the hot runner nozzle 50. It is recognizable in FIG. 5b through the longitudinal slot 75 that the longitudinal slot 75 of the heating unit 70 only crosses a short section of the thermocouple 63 arranged therein. Thus, also only a short section of the thermocouple 63 is in the area of the longitudinal slot such that the thermocouple 63 cannot emerge from the groove 67. The longitudinal slots 75, 76 of the heating device 48 are thus arranged with respect to the thermocouple 63, or to the groove 67 on the hot runner nozzle 50 respectively, such that the thermocouple 63 is reliably retained in the groove 67 by the heating unit 70.

FIG. 6a shows a further illustrative heating device 48 having two longitudinal slots 75 and two longitudinal slots 76 prior to its mounting on the hot runner nozzle 50. The longitudinal slots 75, 76 of this illustrative embodiment exhibit a stepped form, the sections arranged at a right angle to one another. As a whole, the longitudinal slots 75, 76 are arranged at an inclination to axis A of the heating device 48. A groove 67 arranged parallel to the axis of the hot runner nozzle 50 is milled into the outer surface of said hot runner nozzle 50. A thermocouple 63 is arranged in said groove 67 which is held by the heating device 48 after the heating device 48 is slipped onto the hot runner nozzle 50. FIG. 6b shows the heating device 48 in the mounted state to the hot runner nozzle 50. The heating unit 70 of the heating device 48 thereby extends from the rear end region 51 to the front end region 53 of the hot runner nozzle 50. It is recognizable in FIG. 6b through the longitudinal slot 75 that the longitudinal slot 75 of the heating unit 70 only crosses a short section of the thermocouple 63 arranged therein. Thus, also only a short section of the thermocouple 63 is in the area of the longitudinal slot such that the thermocouple 63 cannot emerge from the groove 67. The longitudinal slots 75, 76 of the heating device 48 are thus arranged with respect to the thermocouple 63, or to the groove 67 on the hot runner nozzle 50 respectively, such that the thermocouple 63 is reliably retained in the groove 67 by the heating unit 70.

Figure 7:
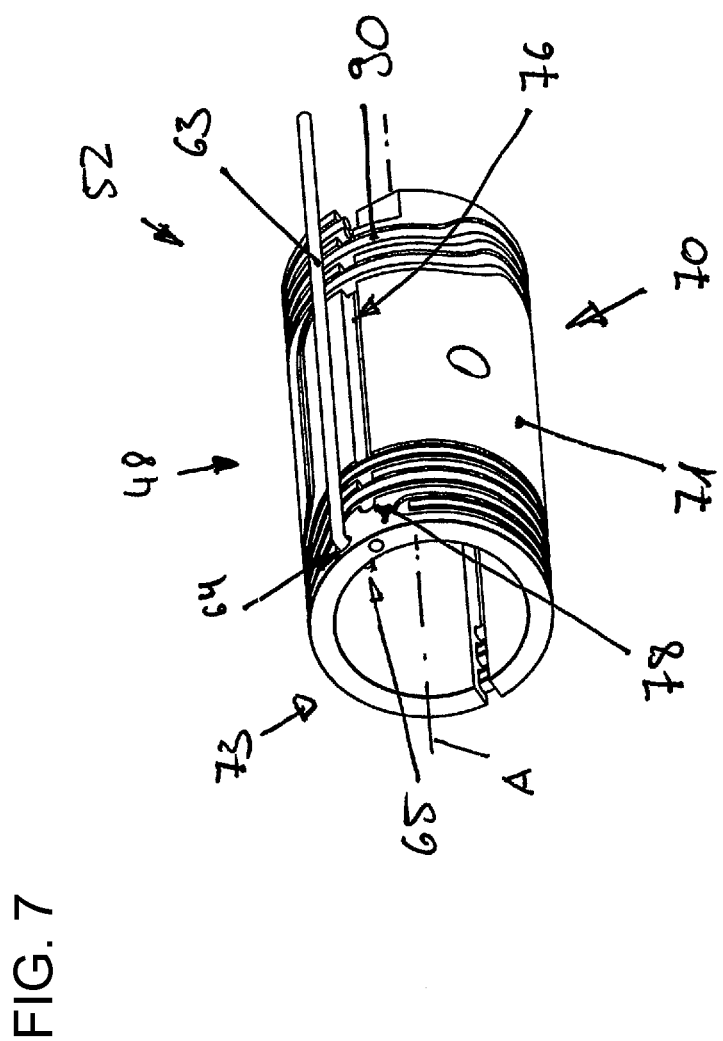
FIG. 7: the illustrative heating unit of FIG. 2a with a thermocouple disposed thereon.

FIG. 7 shows the illustrative heating unit 70 from FIG. 2a, whereby a heating element 90 is disposed in the channel 72 running around the outer surface 71 in this depiction. FIG. 7 thus shows an illustrative heating device 48. A thermo-couple 63 is further disposed on the heating unit 70 of the heating device 48 so as to form a heater/thermocouple assembly 52. The thermocouple 63 runs parallel to longitudinal axis A of the heating unit 70 in easily accessible manner on the exterior surface 71 of the heating unit 70 along to the end region 73, which, during operation, is disposed adjacent to the front end region 53 of the hot runner nozzle 50. As is likewise shown in FIG. 2, a recess is disposed in the form of a bore hole 64 in this end region 73. Said bore hole 64 is disposed circumferentially offset to the heating unit 70 in relation to the closed end 78 of the longitudinal slot 76. Since the axially arranged thermocouple 63 is aligned to the bore hole 64 in the circumferential direction of the heating unit 70, the thermocouple 63 does not hinder access to the longitudinal slot 76. The temperature detecting section 65 of the thermocouple 63, which is arranged at its end, is led through the bore hole 64 to the hot runner nozzle 50.

Figure 7A:
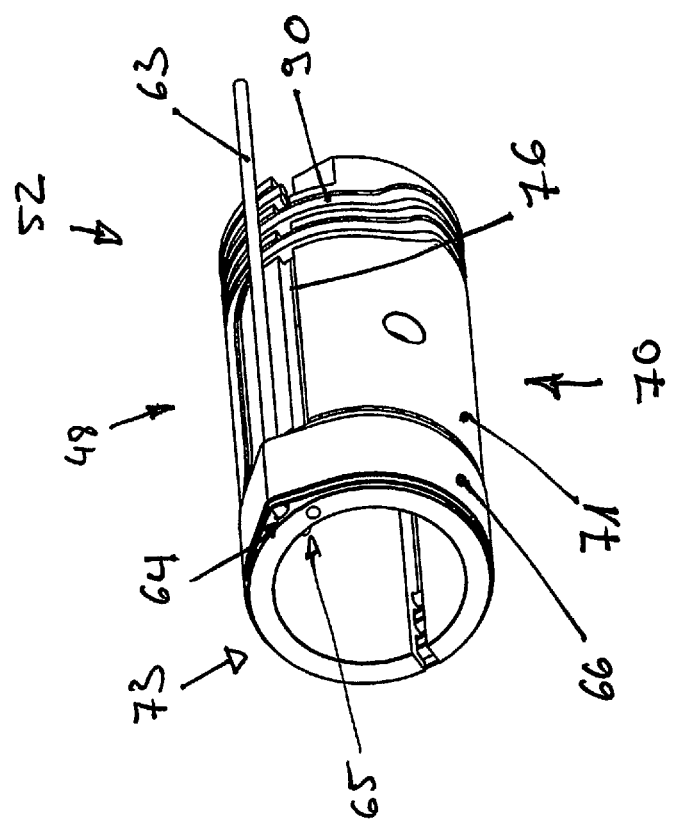
FIG. 7a: an illustrative heater/thermocouple assembly comprising the heating unit of FIG. 7 with a thermocouple securing device arranged thereon.

The illustrative heater/thermocouple assembly 52 shown in FIG. 7a differs from the FIG. 7 depiction in that a securing device 66 is arranged on the heater/thermocouple assembly 52. The securing device 66 is a surrounding band around the heating unit 70 as well as the thermocouple 63 which is made from a heat-resistant material and secures the thermocouple 63 to the heating unit 70.

Figure 8:
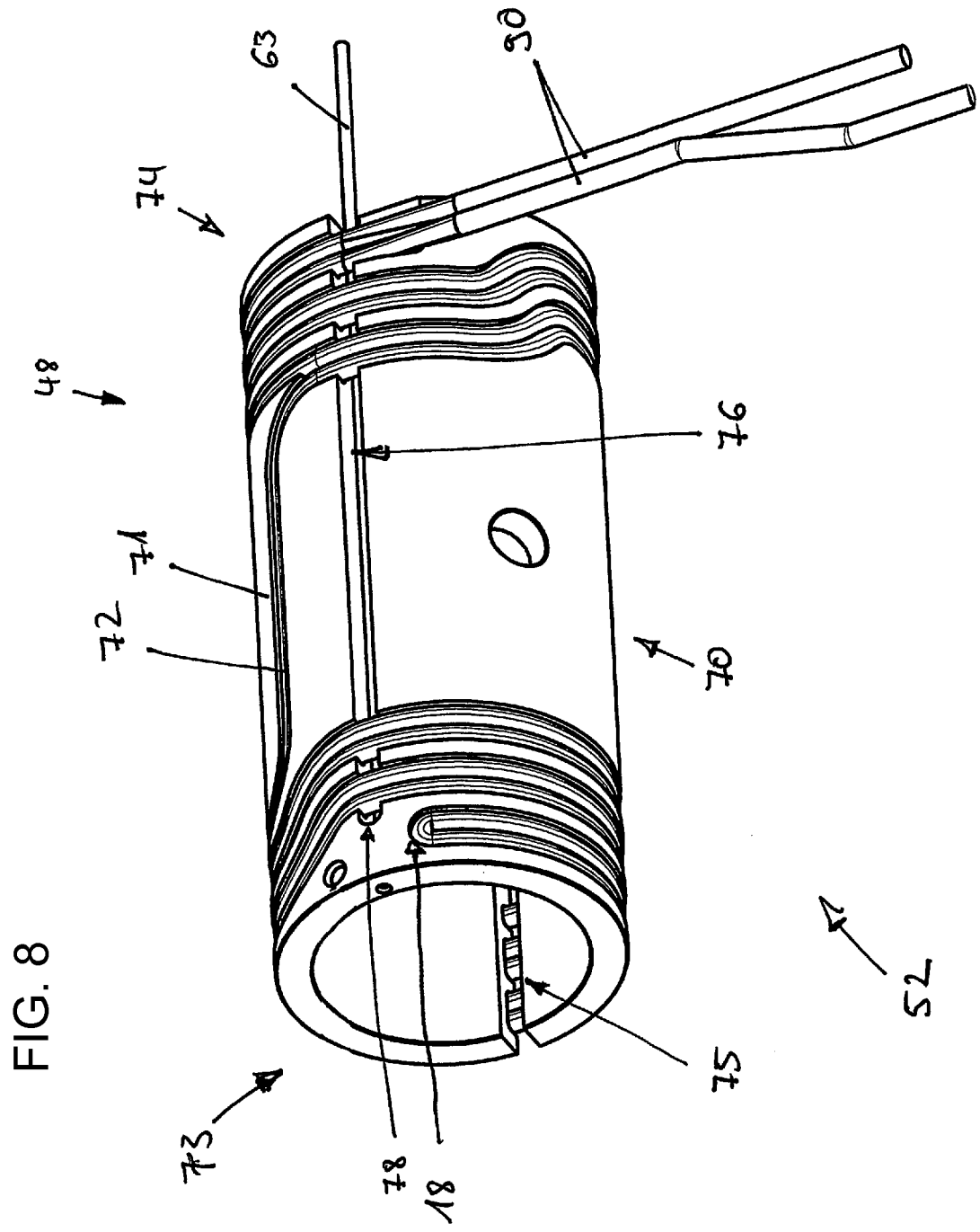

FIG. 8 shows a heater/thermocouple assembly 52 comprising a heating device 48 having the illustrative heating unit 70 from FIG. 2a. A heating element 90 is arranged on the heating device 48, its front end received in the shape of a 180° loop 18 in a correspondingly configured section of the channel 72 in the end region 73 of the heating unit 70. The side-by-side doubled arrangement of the heating element 90 in the channel 72 depicted in FIG. 8 enables a higher introduction of heat into the heating unit 70. The channel 72 runs in the outer surface 71 of the heating unit 70 and thereby guides the heating element 90 arranged therein from the end region 73 which, in operation, is arranged adjacent to the front end region 51 of the hot runner nozzle 50, to the other end region 74 of the heating device 48. The channel 72 terminates at the periphery of end region 74. The two ends of the heating element 90 run outward from here to their connections to the power supply.

Figure 9:
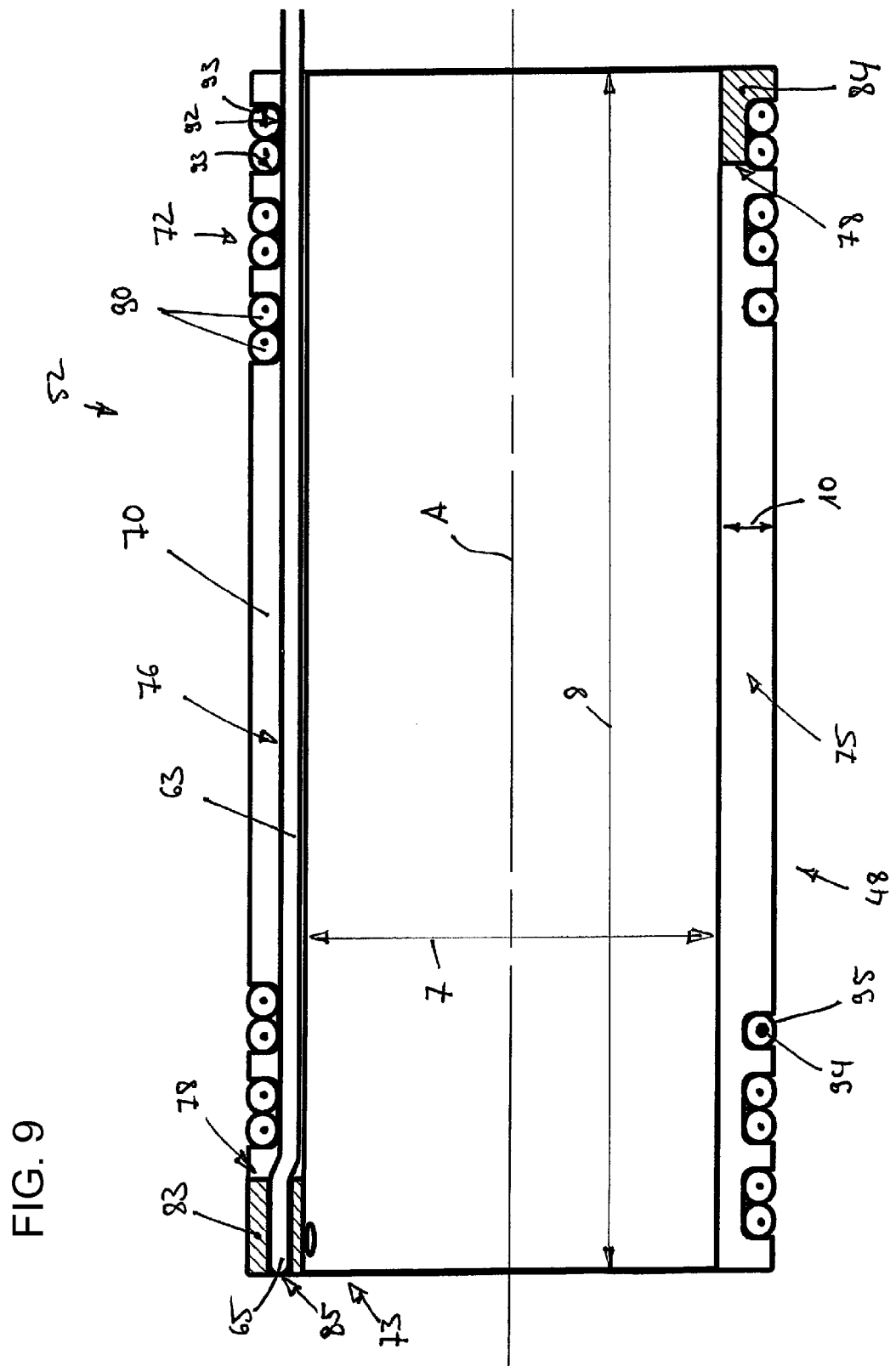
FIG. 9: a sectional view of a heater/thermocouple assembly comprising the illustrative heating unit of FIG. 2a and a thermocouple disposed thereon.

FIG. 9 shows a sectional view through an illustrative heater/thermocouple assembly 52 comprising the heating device 48 from FIG. 2b and a thermocouple 63 arranged thereon. The depicted heating unit 70 exhibits two diametrically arranged longitudinal slots 75 and 76. The bridges 83 and 84 formed in the area of the closed ends 78 are shown. A heating element 90 is disposed in the channel 72 extending around the circumference of the heating unit 70 which is shown sectionally when respectively crossing the longitudinal slots 75 and 76. The heater housing 95 as well as the heater wire 94 arranged therein are shown. As can further be seen from this sectional view, the channel 72 exhibits a bottom surface 92 as well as two side walls 93. Each heating element 90 is in close contact with a respective one of the two side walls 93 of the channel 72 in this configuration.

A thermocouple 63 is radially arranged within the winding of the heating element 90 in the longitudinal slot 76. The front end 65 of the thermocouple 63 is disposed in a recess 85, which is open to the face side of the heating unit 70 arranged in end region 73, formed in bridge 83.

FIG. 10 shows an illustrative heater/thermocouple assembly 52 with a heating device 48 disposed on a hot runner nozzle 50. The hot runner nozzle 50 is connected to a hot runner manifold block 33 and to a runner 40 by a nozzle holder ring 49 arranged on its rear end region 51. The melt processed by the hot runner injection molding machine is conveyed in a runner extending inside the hot runner nozzle 50 from its rear end region 51 to its front end region 53 and to the valve 54 arranged there. A heat shield 68 is further arranged at the front end region 53 of the hot runner nozzle 50 which serves in reducing thermal outflow from the hot runner nozzle 50 to the mold insert 35 and mold core 57.

The heating device 48 is mounted on the hot runner nozzle 50 such that the closed end 78 of the first longitudinal slot 76 is arranged adjacent to the front end region 53 of the hot runner nozzle 50. The closed end 78 forms a bridge 83 at this point. A heating element 90 is arranged in the channel 72 extending around the circumference of the heating unit 70.

A thermocouple 63 is radially arranged within the winding of the heating element 90 in the longitudinal slot 76. The front end 65 of the thermocouple 63 is disposed in a recess arranged adjacent to bridge 83. The thermocouple 63 is thus arranged within the heating device 48 so as to be easily accessible. The temperature detecting section 65 is situated in an area in which, due to the thermal outflow from this area, knowledge of the exact temperature of the hot runner nozzle 50, or the melt situated therein respectively, is necessary particularly to control the heat output of the heating device 48. The bridge 83 prevents the inner diameter of the heating unit 70 from enlarging in this area, wherein a good contact and thus good heat transfer is made possible from the heating unit 70 to the hot runner nozzle 50. This configuration also enables, in addition to the development of a suitable temperature profile, a suitable detecting of the temperature at the hot runner nozzle 50 by means of the temperature detecting section 65 of the thermocouple 63 arranged in the heating unit 70.

Figure 10A:
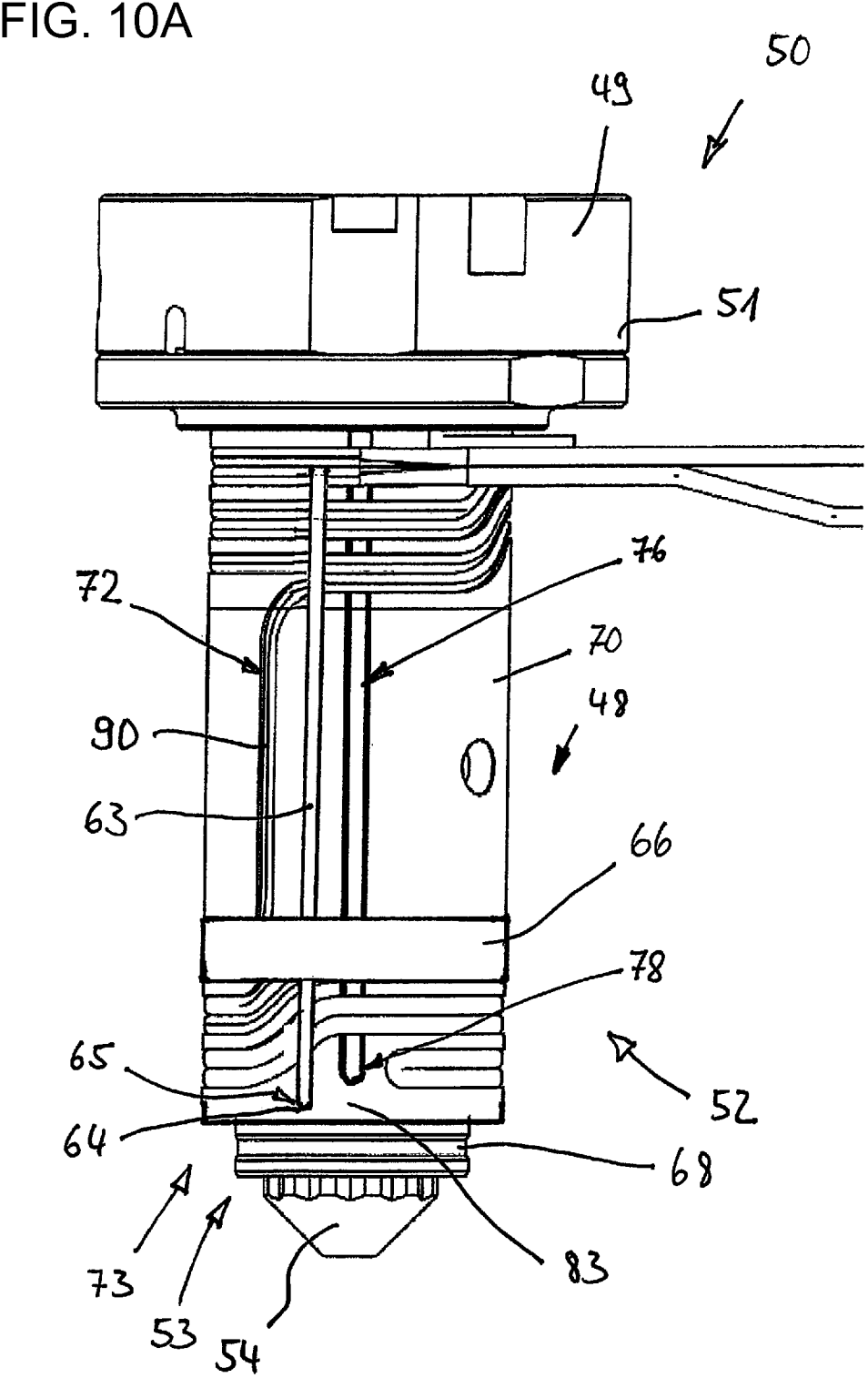
FIG. 10a: the illustrative heater/thermocouple assembly from FIG. 10 with an alternative arrangement of the thermocouple.

FIG. 10a likewise shows an illustrative heater/thermocouple assembly 52 disposed on a hot runner nozzle 50 which differs from the heater/thermocouple assembly 52 of FIG. 6 in the arrangement of the thermocouple 63. In FIG. 10a, the thermocouple 63 is depicted disposed external of the longitudinal slot 76. This type of configuration lends itself particularly to the use of a heating unit 70 having only one longitudinal slot 76.

As described in greater detail with respect to FIG. 10, the closed end 78 of the first longitudinal slot 76 forms a first bridge 83 in the end region of the heating unit 70 which is disposed adjacent to the front end region 53 of the hot runner nozzle 50. A recess 64 is further arranged adjacent to the first bridge 83 in end region 73. The thermocouple disposed on the heating unit 70 of the heater/thermocouple assembly 52 runs parallel to the longitudinal slot 76 of the heating unit 70 in easily accessible manner on the outer surface 71 of the heating unit 70 along to end region 73 which, during operation, is arranged adjacent to the front end region 53 of the hot runner nozzle 50. The recess is disposed circumferentially offset to the heating unit 70 in relation to the closed end 78 of the longitudinal slot 76. Since the axially arranged thermocouple 63 is aligned to the recess 64 in the circumferential direction of the heating unit 70, the thermocouple 63 does not hinder access to the longitudinal slot 76. The temperature detecting section 65 arranged at the end of the thermocouple 63 is led through the recess 64 to the hot runner nozzle 50.

A securing device 66 is further arranged on the heater/thermocouple assembly 52 shown in FIG. 10a. Same is a surrounding band around the heating device 48 and the thermocouple 63 which is made from a heat-resistant material and secures the thermocouple 63 to the heating device 48.

Figure 11:
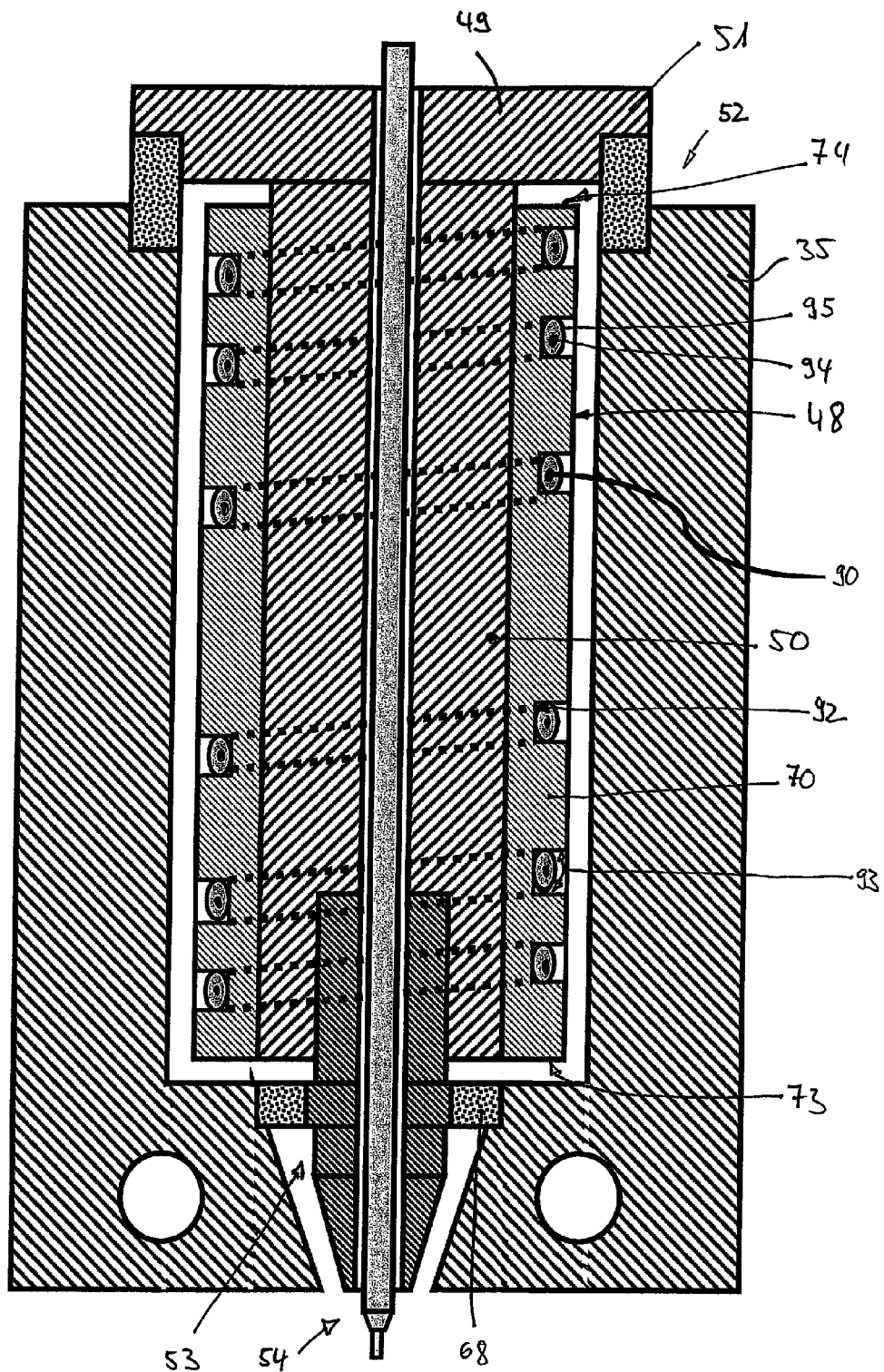
FIG. 11: a sectional view of a further illustrative heater/thermocouple assembly disposed on a hot runner nozzle.

FIG. 11 shows a further illustrative heater/thermocouple assembly 52 disposed on a hot runner nozzle 50. The hot runner nozzle 50 is connected to a hot runner manifold block 33 and to a runner 40 by a nozzle holder ring 49 arranged on its rear end region 51. The melt processed by the hot runner injection molding machine is conveyed in a runner extending inside the hot runner nozzle 50 from its rear end region 51 to its front end region 53 and to the valve 54 arranged there. A heat shield 68 is further arranged at the front end region 53 of the hot runner nozzle 50 which serves in reducing thermal outflow from the hot runner nozzle 50 to the mold.

The heating device 48 is mounted in such a way on the hot runner nozzle 50 that the closed end 78 of the first longitudinal slot 76 (not shown in FIG. 11) is disposed adjacent to the front end region 53 of the hot runner nozzle 50. A channel 72 is sunk into the outer surface 71 of the heating unit 70 and winds around said heating unit. The pitch to the windings of the channel 72 is less in the two end regions 73 and 74 of the heating unit than in an area between the two end regions, whereby the heat input into the end regions 73 and 74 is higher than in the area between them in which the pitch to the windings of the channel 72 is larger.

A heating element 90, depicted sectionally, is disposed in the channel 72. The channel 72 exhibits a bottom surface 92 as well as two side walls 93. The heating element 90 in this configuration is in close contact with both side walls 93 of the channel 72.

The invention claimed is:

1. A removable heating device for a hot runner nozzle, comprising:
   an elongated heating unit formed from a thermoconductive material, said elongated heating unit having an inner diameter, a length, an axis, an inner surface, an outer surface and a wall thickness;

said elongated heating unit having at least one first longitudinal slot formed therein and said first longitudinal slot does not extend as far in a longitudinal direction as said length of said elongated heating unit being a cylindrical heating unit, said first longitudinal slot having a width and an open end on a first face side of said elongated heating unit and a closed end on a second face side of said elongated heating unit so as to form a first bridge limiting an enlargement of said inner diameter of said elongated heating unit on one end of said elongated heating unit, wherein an enlargement of said inner diameter is enabled by said open end of said first longitudinal slot;

said elongated heating unit having a channel formed therein in said outer surface of said elongated heating unit and said channel winding around said elongated heating unit, said channel defining a bottom surface and two side walls, said channel running completely around said elongated heating unit and crossing said first longitudinal slot at least once; and an electrical heating element with a heater housing and a heater wire disposed in said heater housing, said heater housing being at least partially disposed in said channel and being in direct contact with said bottom surface and with at least one of said two side walls so as to transfer heat generated by said electrical heating element to the hot runner nozzle via contact between said inner surface of said elongated heating unit and an outer surface of the hot runner nozzle, and wherein said electrical heating element limiting said elongated heating unit from radially expanding in an area of said first longitudinal slot due to warming or due to mechanical force.

2. The removable heating device according to claim 1, wherein said elongated heating unit has at least one second longitudinal slot formed therein, and said second longitudinal slot extends less in the longitudinal direction than said length of said cylindrical heating unit, wherein a closed end of said second longitudinal slot is disposed on said first face side of said elongated heating unit so as to form a second bridge which limits an enlargement of said inner diameter of said elongated heating unit at said end of said elongated heating unit.

3. The removable heating device according to claim 2, wherein said elongated heating unit has two further longitudinal slots formed therein, wherein an open end of one of said two further longitudinal slots is disposed on said first face side of said elongated heating unit and an open end of the other of said two further longitudinal slots is disposed on said second face side of said elongated heating unit.

4. The removable heating device according to claim 3, wherein said two further longitudinal slots are disposed in diametrical opposition in relation to said axis of said elongated heating unit, wherein said two further longitudinal slots are disposed offset to at least one of said first or said second longitudinal slot by 90° relative to said axis of said elongated heating unit.

5. The removable heating device according to claim 3, wherein at least one of said longitudinal slots is disposed in even distribution over a circumference of said elongated heating unit.

6. The removable heating device according to claim 3, wherein said closed ends of said longitudinal slots are disposed respectively alternatingly adjacent to said first face side and said second face side of said elongated heating unit during operation.

7. The removable heating device according to claim 3, wherein at least one of said longitudinal slots extends longitudinally relative to said axial length of said elongated heating unit over at least 60% of said length of said elongated heating unit.

8. The removable heating device according to claim 3, wherein a length of at least one of said longitudinal slots is greater than an extension of said at least one longitudinal slot in a direction of the longitudinal axis of said elongated heating unit.

9. The removable heating device according to claim 8, wherein at least one of said longitudinal slots is disposed at an inclined angle relative to the longitudinal axis of said elongated heating unit, wherein an inclination of said at least one longitudinal slot relative to the longitudinal axis of said elongated heating unit contains an angle in a range of 0.5° to 30°.

10. The removable heating device according to claim 8, wherein at least one of said longitudinal slots has at least sections of one of a waved configuration or a stepped configuration.

11. The removable heating device according to claim 3, wherein at least one of said longitudinal slots extends longitudinally relative to said length of said elongated heating unit over at least 80% of said length of said elongated heating unit.

12. The removable heating device according to claim 3, wherein at least one of said longitudinal slots extends longitudinally relative to said length of said elongated heating unit over at least 85% of said length of said elongated heating unit.

13. The removable heating device according to claim 3, wherein said at least one of said longitudinal slots extends longitudinally relative to said length of said elongated heating unit over at least 90% of said length of said elongated heating unit.

14. The removable heating device according to claim 8, wherein at least one of said longitudinal slots is disposed at an inclined angle relative to the longitudinal axis of said elongated heating unit, wherein an inclination of said at least one longitudinal slot relative to the longitudinal axis of said elongated heating unit contains an angle in a range of 1° to 15°.

15. The removable heating device according to claim 8, wherein at least one of said longitudinal slots is disposed at an inclined angle relative to the longitudinal axis of said elongated heating unit, wherein an inclination of said at least one longitudinal slot relative to the longitudinal axis of said elongated heating unit contains an angle in a range of 1.5° to 10°.

16. The removable heating device according to claim 8, wherein at least one of said longitudinal slots is disposed at an inclined angle relative to the longitudinal axis of said elongated heating unit, wherein an inclination of said at least one longitudinal slot relative to the longitudinal axis of said elongated heating unit contains an angle in a range of 3° to 5°.

17. The removable heating device according to claim 2, wherein said first and second two longitudinal slots are disposed in substantially diametrical opposition in relation to said axis of said elongated heating unit.

18. The removable heating device according to claim 1, wherein said elongated heating unit has two further longitudinal slots formed therein, wherein an open end of one of said two further longitudinal slots is disposed on said first face side of said elongated heating unit and an open end of the other of said two further longitudinal slots is disposed on said second face side of said elongated heating unit.

19. The removable heating device according to claim 2, wherein said closed ends of said longitudinal slots are disposed respectively alternatingly adjacent to said first face side and said second face side of said elongated heating unit during operation.

20. The removable heating device according to claim 2, wherein at least one of said longitudinal slots extends longitudinally relative to said axial length of said elongated heating unit over at least 60% of said length of said elongated heating unit.

21. The removable heating device according to claim 1, wherein said first longitudinal slot extends longitudinally relative to said axial length of said elongated heating unit over at least 60% of said length of said elongated heating unit.

22. The removable heating device according to claim 2, wherein a length of at least one of said longitudinal slots is greater than an extension of said at least one longitudinal slot in a direction of the longitudinal axis of said elongated heating unit.

23. The removable heating device according to claim 2, wherein a length of said first longitudinal slot is greater than an extension of said first longitudinal slot in a direction of the longitudinal axis of said elongated heating unit.

24. The removable heating device according to claim 22, wherein at least one of said longitudinal slots is disposed at an inclined angle relative to the longitudinal axis of said elongated heating unit, wherein an inclination of said at least one longitudinal slot relative to the longitudinal axis of said elongated heating unit contains an angle in a range of 0.5° to 30°.

25. The removable heating device according to claim 23, wherein said first longitudinal slot is disposed at an inclined angle relative to the longitudinal axis of said elongated heating unit, wherein an inclination of said first longitudinal slot relative to the longitudinal axis of said elongated heating unit contains an angle in a range of 0.5° to 30°.

26. The removable heating device according to claim 22, wherein at least one of said longitudinal slots has at least sections of one of a waved configuration or a stepped configuration.

27. The removable heating device according to claim 23, wherein said first longitudinal slot has at least sections of one of a waved configuration or a stepped configuration.

28. A removable heater/thermocouple assembly for a hot runner nozzle, the removable heater/thermocouple assembly comprising:
a thermocouple having a temperature detecting section; and
a heating device, containing:
an elongated heating unit formed from a thermoconductive material, said elongated heating unit having an inner diameter, a length, an axis, an inner surface, an outer surface and a wall thickness;
said elongated heating unit having at least one first longitudinal slot formed therein and said first longitudinal slot does not extend as far in a longitudinal direction as said length of said elongated heating unit being a cylindrical heating unit, wherein said first longitudinal slot having a width and an open end on a first face side of said elongated heating unit and a closed end on a second face side of said elongated heating unit so as to form a first bridge limiting an enlargement of said inner diameter of said elongated heating unit on one end of said elongated heating unit, wherein the enlargement of said inner diameter is enabled by said open end of said first longitudinal slot; and
said elongated heating unit having a channel formed in said outer surface of said elongated heating unit and winding around said elongated heating unit, said channel having a bottom surface and two side walls, wherein said channel running completely around said elongated heating unit and crossing said first longitudinal slot at least once; and
an electrical heating element containing a heater housing and a heater wire disposed in said heater housing, wherein said heater housing being at least partially disposed in said channel and being in direct contact with said bottom surface and with at least one of said two side walls so as to transfer heat generated by said elongated heating element to the hot runner nozzle via contact between said inner surface of said elongated heating unit and an outer surface of the hot runner nozzle, and wherein said electrical heating element limiting said elongated heating unit from radially expanding in an area of said first longitudinal slot due to warming or due to mechanical force.

29. The removable heater/thermocouple assembly according to claim 28, wherein said elongated heating unit having at least one second longitudinal slot formed therein and said second longitudinal slot extends less in the longitudinal direction than said length of said cylindrical heating unit, wherein a closed end of said second longitudinal slot is disposed on said first face side of said elongated heating unit so as to form a second bridge which limits an enlargement of said inner diameter of said elongated heating unit at said end of said elongated heating unit.

30. The removable heater/thermocouple assembly according to claim 29, wherein said elongated heating unit having two further longitudinal slots formed therein, wherein an open end of one of said two further longitudinal slots is disposed on said first face side of said elongated heating unit and an open end of the other of said two further longitudinal slots is disposed on said second face side of said elongated heating unit.

31. The removable heater/thermocouple assembly according to claim 30, wherein said two further longitudinal slots are disposed in a substantially diametrical opposition in relation to the axis of said elongated heating unit, wherein said two further longitudinal slots are disposed offset to at least one of said first or said second longitudinal slot by approximately 90° relative to the axis of said elongated heating unit.

32. The removable heater/thermocouple assembly according claim 30, wherein said longitudinal slots are disposed in even distribution over a circumference of said elongated heating unit.

33. The removable heater/thermocouple assembly according to claim 30, wherein said closed ends of said longitudinal slots are disposed respectively alternatingly adjacent to said first face side and said second face side of said elongated heating unit during operation.

34. The removable heater/thermocouple assembly according to claim 30, wherein at least one of said longitudinal slots extends longitudinally relative to said length of said elongated heating unit over at least 60% of said length of said elongated heating unit.

35. The removable heater/thermocouple assembly according to claim 30, wherein said length of at least one of said longitudinal slots is greater than an extension of said at least one longitudinal slot in the direction of the longitudinal axis of said elongated heating unit.

36. The removable heater/thermocouple assembly according to claim 35, wherein at least one of said longitudinal slots is disposed at an inclined angle relative to the longitudinal axis of said elongated heating unit, wherein an inclination of said at least one longitudinal slot relative to the longitudinal axis of said elongated heating unit contains an angle in the range of 0.5° to 30°.

37. The removable heater/thermocouple assembly according claim 35, wherein at least one of said longitudinal slots has at least sections of at least one of a waved configuration or a stepped configuration.

38. The removable heater/thermocouple assembly according to claim 30, wherein said thermocouple is disposed on said heating unit such that free access to said first longitudinal slot is possible for a tool without the tool thereby touching said thermocouple, wherein said temperature detecting section of said thermocouple is disposed such that a temperature in a front end region of the hot runner nozzle can be detected, and wherein said elongated heating unit with said thermocouple can be removed from the hot runner nozzle by expanding said first longitudinal slot with the tool, wherein by expanding said first longitudinal slot a bond having developed during operation between said elongated heating unit and the hot runner nozzle can be dissolved.

39. The removable heater/thermocouple assembly according claim 28, further comprising at least one further thermocouple.

40. The removable heater/thermocouple assembly according to claim 30, wherein said at least one thermocouple is disposed adjacent to one of said longitudinal slots in the longitudinal direction of said elongated heating unit.

41. The removable heater/thermocouple assembly according to claim 38, wherein said at least one thermocouple is disposed in one of said longitudinal slots and the tool can be inserted into at least one other of said longitudinal slots.

42. The removable heater/thermocouple assembly according to claim 28, wherein:
said elongated heating unit has a recess formed therein; and
said temperature detecting section of said at least one thermocouple is disposed in said recess in said elongated heating unit.

43. The removable heater/thermocouple assembly according to claim 28, wherein:
said elongated heating unit has a recess formed therein; and
said temperature detecting section of said at least one thermocouple is led through said recess in said elongated heating unit to the hot runner nozzle.

44. The removable heater/thermocouple assembly according to claim 42, wherein said recess is disposed in said first bridge or adjacent to said first bridge.

45. The removable heater/thermocouple assembly according to claim 28, wherein the removable heater/thermocouple assembly is connected to a control device which is fed measurement signals from said at least one thermocouple and the control device controls a thermal output of said electrical heating element.

46. The removable heater/thermocouple assembly according to claim 30, wherein at least one of said longitudinal slots extends longitudinally relative to said length of said elongated heating unit over at least 80% of said length of said elongated heating unit.

47. The removable heater/thermocouple assembly according to claim 30, wherein at least one of said longitudinal slots extends longitudinally relative to said length of said elongated heating unit over at least 85% of said length of said elongated heating unit.

48. The removable heater/thermocouple assembly according to claim 30, wherein at least one of said longitudinal slots extends longitudinally relative to the length of said elongated heating unit over at least 90% of said length of said elongated heating unit.

49. The removable heater/thermocouple assembly according to claim 35, wherein at least one of said longitudinal slots is disposed at an inclined angle relative to the longitudinal axis of said elongated heating unit, wherein an inclination of said at least one longitudinal slot relative to the longitudinal axis of said elongated heating unit contains an angle in the range of 1° to 15°.

50. The removable heater/thermocouple assembly according to claim 35, wherein at least one of said longitudinal slots is disposed at an inclined angle relative to the longitudinal axis of said elongated heating unit, wherein an inclination of said at least one longitudinal slot relative to the longitudinal axis of said elongated heating unit contains an angle in the range of 1.5° to 10°.

51. The removable heater/thermocouple assembly according to claim 35, wherein at least one of said longitudinal slots is disposed at an inclined angle relative to the longitudinal axis of said elongated heating unit, wherein an inclination of said at least one longitudinal slot relative to the longitudinal axis of said elongated heating unit contains an angle in the range of 3° to 5°.

52. The removable heater/thermocouple assembly according to claim 29, wherein said first and second longitudinal slots are disposed in diametrical opposition in relation to the axis of said elongated heating unit.

53. The removable heater/thermocouple assembly according to claim 29, wherein said elongated heating unit having two further longitudinal slots formed therein, wherein an open end of both of said two further longitudinal slots is disposed on said first face side of said elongated heating unit.

54. The removable heater/thermocouple assembly according to claim 29, wherein said elongated heating unit having two further longitudinal slots formed therein, wherein an open end of both of said two further longitudinal slots is disposed on said second face side of said elongated heating unit.

55. The removable heater/thermocouple assembly according to claim 28, wherein said thermocouple is disposed on said heating unit such that free access to said first longitudinal slot is possible for a tool without the tool thereby touching said thermocouple, wherein said temperature detecting section of said thermocouple is disposed such that a temperature in a front end region of the hot runner nozzle can be detected, and wherein said elongated heating unit with said thermocouple can be removed from the hot runner nozzle by expanding said first longitudinal slot with the tool, wherein by expanding said first longitudinal slot a bond having developed during operation between said elongated heating unit and the hot runner nozzle can be dissolved.

56. The removable heater/thermocouple assembly according to claim 29, wherein said thermocouple is disposed on said heating unit such that free access to said first longitudinal slot is possible for a tool without the tool thereby touching said thermocouple, wherein said temperature detecting section of said thermocouple is disposed such that a temperature in a front end region of the hot runner nozzle can be detected, and wherein said elongated heating unit with said thermocouple can be removed from the hot runner nozzle by expanding said first longitudinal slot with the tool, wherein by expanding said first longitudinal slot a bond having developed during operation between said elongated heating unit and the hot runner nozzle can be dissolved.

57. The removable heater/thermocouple assembly according to claim 43, wherein said recess is disposed in said first bridge or adjacent to said first bridge.

* * * * *